(12) United States Patent
Okazaki et al.

(10) Patent No.: US 8,569,095 B2
(45) Date of Patent: Oct. 29, 2013

(54) OPTICAL DEVICE, OPTICAL EQUIPMENT AND METHOD FOR MANUFACTURING OPTICAL DEVICE

(75) Inventors: Mitsuhiro Okazaki, Saitama (JP); Koichiro Iwahori, Fuchu (JP)

(73) Assignee: Nikon Corporation, Tokyo (JP)

( * ) Notice: Subject to any disclaimer, the term of this patent is extended or adjusted under 35 U.S.C. 154(b) by 398 days.

(21) Appl. No.: 12/831,548

(22) Filed: Jul. 7, 2010

(65) Prior Publication Data

US 2011/0007393 A1    Jan. 13, 2011

(30) Foreign Application Priority Data

Jul. 8, 2009 (JP) ................................ 2009-162034

(51) Int. Cl.
*H01L 21/00* (2006.01)
(52) U.S. Cl.
USPC ............................................ 438/65; 257/432
(58) Field of Classification Search
USPC ............................................ 438/65; 257/432
See application file for complete search history.

(56) References Cited

FOREIGN PATENT DOCUMENTS

| JP | A-03-025895 | 2/1991 |
|---|---|---|
| JP | A-05-114482 | 5/1993 |
| JP | A-07-331413 | 12/1995 |
| JP | A-2002-204379 | 7/2002 |
| JP | A-2003-338965 | 11/2003 |
| JP | A-2005-148379 | 6/2005 |
| JP | A-2005-219458 | 8/2005 |
| JP | A-2006-502597 | 1/2006 |
| JP | A-2006-071851 | 3/2006 |
| JP | A-2007-147991 | 6/2007 |
| JP | A-2007-318496 | 12/2007 |
| JP | A-2008-029917 | 2/2008 |
| JP | A-2008-070750 | 3/2008 |
| JP | A-2008-099332 | 4/2008 |
| WO | WO 2004/038757 A2 | 5/2004 |

OTHER PUBLICATIONS

H. Kawamoto et al., "Traveling Wave Transport of Particles and Particle Size Classification," The Japan Society of Mechanical Engineers Technical Report Journal, Aug. 21, 2002, vol. 69-681 (May 2003), Paper No. 02-1059, pp. 28-33 (with translation).

H. Kawamoto et al., "Fundamental Investigation on Electrostatic Travelling-Wave Transport of Liquid Drop Classification," The Japan Society of Mechanical Engineers Technical Report Journal, Mar. 2, 2005, vol. 71-712 (Dec. 2005), Paper No. 05-02200, pp. 131-135 (with translation).

Translation of Office Action issued in Japanese Application No. 2009-162034 dated Nov. 1, 2011.

*Primary Examiner* — Douglas Menz
(74) *Attorney, Agent, or Firm* — Oliff & Berridge, PLC

(57) ABSTRACT

An optical device comprises a substrate provided with an insulation portion transmitting light, a first electrode and a second electrode transmitting light provided at said substrate sandwiching said insulation portion, and an output circuit to output voltage to said first electrode and second electrode so as to change an electric field of a surface of said substrate, wherein said first and second electrodes comprise main component which is identical with said insulation portion, and an electric resistivity is lower with respect to said insulation portion.

12 Claims, 19 Drawing Sheets

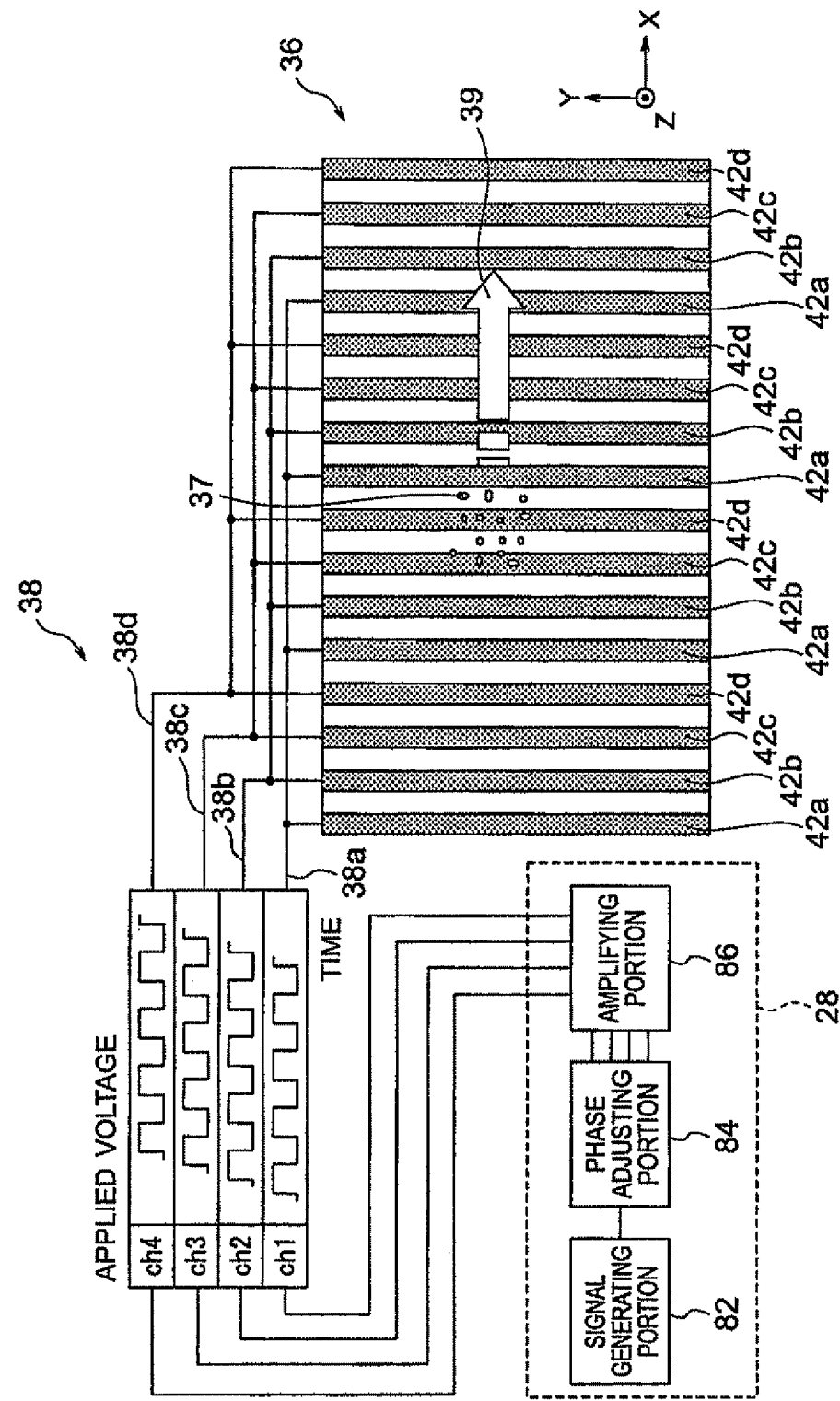

OPTICAL DEVICE, OPTICAL EQUIPMENT AND METHOD FOR MANUFACTURING OPTICAL DEVICE

BACKGROUND OF THE INVENTION

1. Field of the Invention

The present invention relates to an optical device, more precisely, relates to an optical device having dust removing function and a method for manufacturing such optical device.

2. Description of the Related Art

In recent years, in a lens interchangeable digital camera, etc., there are problems such that dust is shown in a taken image due to accretion of the dust on a surface of an optical low-pass, filter of an image pick-up element. In order to solve such problems, a system has been developed wherein an anti-dust member is provided between an image pick-up element and an optical system to ensure dust-prevention for the image pick-up element as well as removing the attached dust on the anti-dust member by physical vibration (refer to Japanese Patent Gazette Laid Open No. 2008-99332).

SUMMARY OF THE INVENTION

A purpose of the invention is to provide an optical device, an optical equipment which are available to efficiently remove dust adhered to a substrate efficiently which transmits right and a method for manufacturing said optical device.

In order to achieve the above purpose, an optical device according to the present invention comprises a substrate transmitting light provided with an insulation portion, a first electrode and a second electrode transmitting light provided on said substrate so as to sandwich said insulation portion, and an output circuit configured to output voltage to said first electrode and second electrode so as to change an electric field of a surface of said substrate, wherein, said first and second electrodes comprise a main component which is the same main component of said insulation portion, and has an electric resistivity lower than that of said insulation portion.

Also, for example, said first electrode maybe comprised of at least one of a material obtained by doping a metal in said insulation portion and a material obtained by transforming the insulation portion into a oxygen deficient conductor.

Also, for example, said insulation portion, said first electrode and said second electrode may have the main component of ZnO.

Also, for example, said insulation portion may be a film provided on said substrate.

Also, for example, said first electrode and said second electrode may be covered by said insulation portion.

Also, for example, said insulation portion, said first electrode and said second electrode may be comprised of a film provided on said substrate.

Also, for example, an optical device according to the present invention may comprise a covering film to cover said first electrode and said second electrode, An optical equipment according to the present invention comprises any one of the above mentioned optical device.

A method for manufacturing optical device according to the present invention comprising steps of preparing a substrate transmitting light, forming an insulation portion transmitting light and electrodes transmitting light on said substrate, the electrodes and the insulation portion has the same main component.

Also, for example, in a method for manufacturing optical device according to the present invention, said electrode may be formed by doping a metal in said insulation portion.

Also, for example, in a method for manufacturing optical device according to the present invention, said electrode may be formed by transforming the insulation portion into a oxygen deficient conductor.

Also, for example, in a method for manufacturing optical device according to the present invention, a film may be formed to cover said electrode.

Note that, in the above explanation, for easily understanding of the present invention it is specified with reference numerals corresponding drawings showing embodiments, the present invention is not limited thereto. It can be modified following mentioned embodiment appropriately, and at least one part can be substituted.

Further, constitutional elements, which are not particularly limited to arrangement thereof, maybe arranged at positions where functions thereof can be achieved which are not limited to the disclosed arrangement in embodiments.

BRIEF EXPLANATION FOR DRAWINGS

Figure 4A:
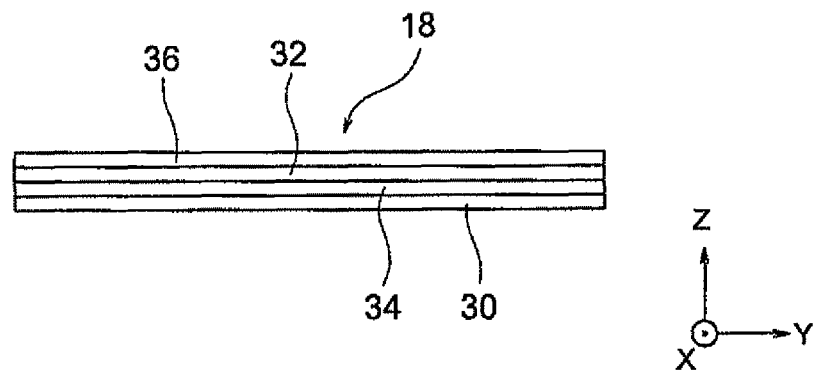
Figure 4B:
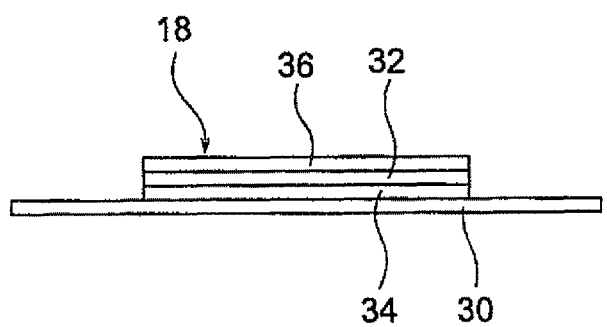
Figure 4C:
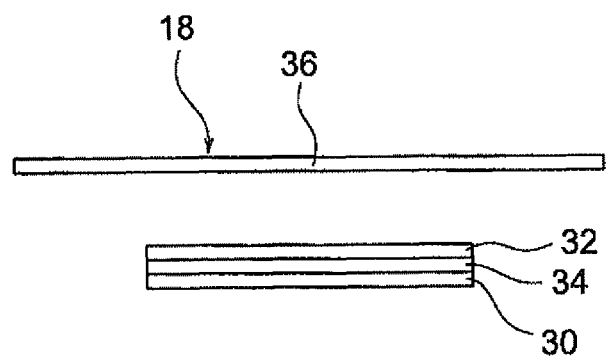

FIG. 4(A) to FIG. 4(C) are cross sectional views of filter portion included in the neighboring part of the image pick up element.

Figure 3:
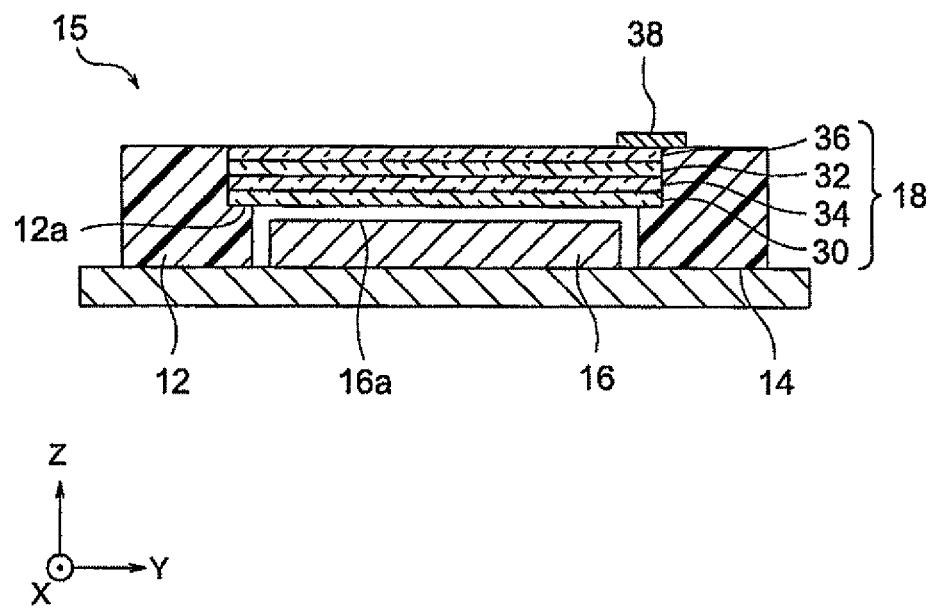
FIG. 3 is a cross sectional view of the neighboring part of the image pick up element along a line shown in FIG. 2.
Figure 5A:
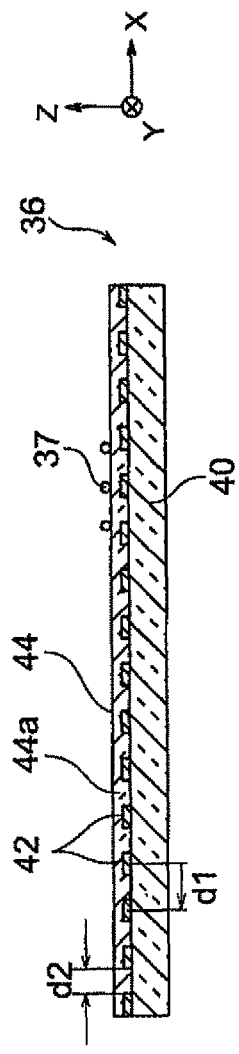
Figure 5B:
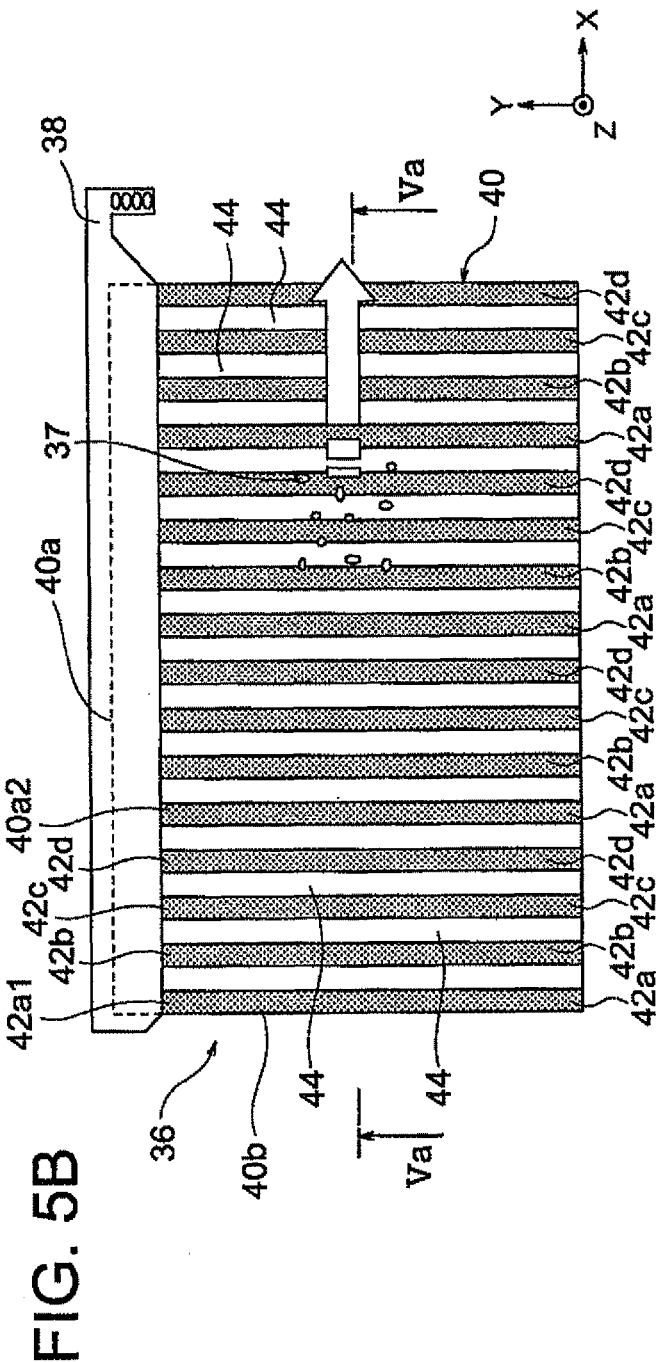

FIG. 5 are a cross sectional view (FIG. 5(A)) and a plane view (FIG. 5(B)) of an antidust filter included in the neighboring part of the image pick up element shown in FIG. 3.

FIG. 6 is a schematic view for explaining dust removing operation by using the antidust filter shown in FIG. 5.

FIG. 7(A) to FIG. 7(D) are schematic cross sectional views showing manufacturing processes of the antidust filter shown in FIG. 5.

Figure 8:
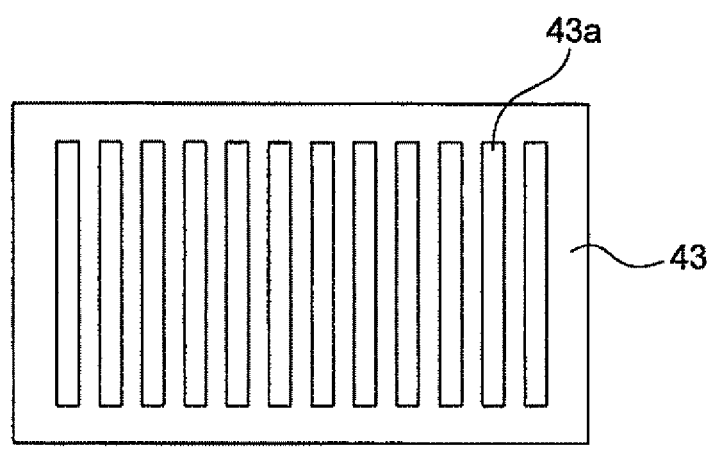

FIG. 8 is a plane view of a mask for an electrode used for a manufacturing process for the antidust filter shown in FIG. 5.

Figure 9:
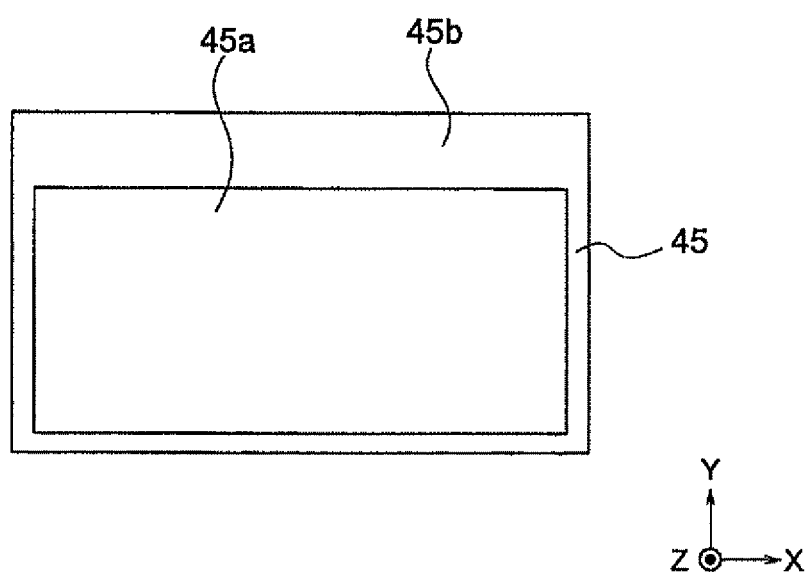

FIG. 9 is a plane view of a mask for an insulation layer used for manufacturing process for the antidust filter shown in FIG. 5.

Figure 10:
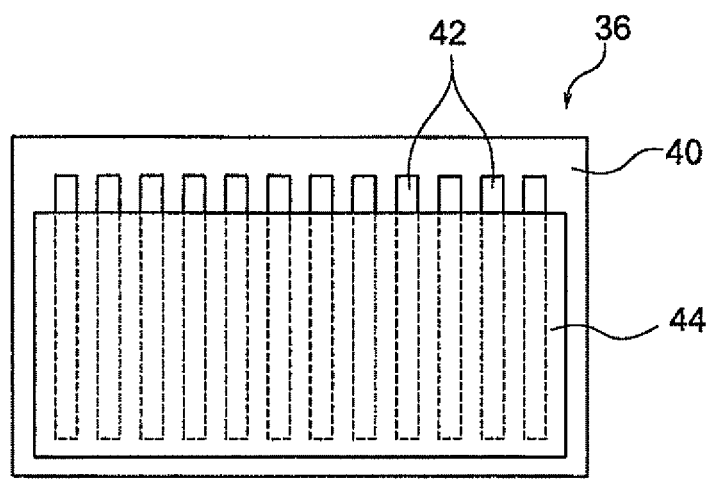
Figure 11:
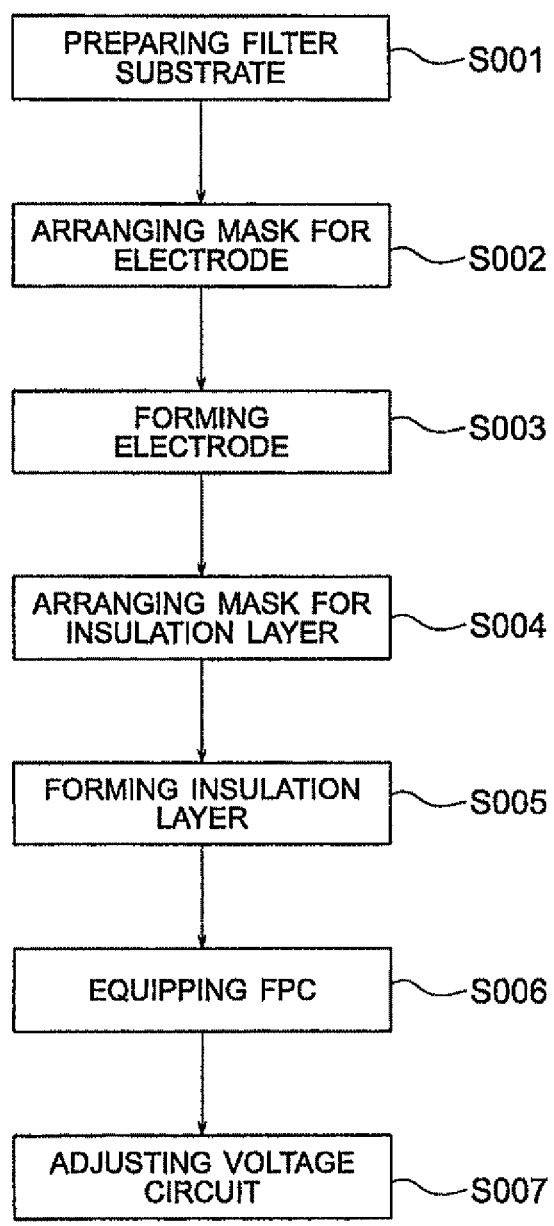

FIG. 10 is a plane view of the antidust filter produced by the manufacturing process shown in FIG. 11 and the like.

FIG. 11 is a flow chart showing a manufacturing process of the antidust filter according to a first embodiment of the present invention.

Figure 12:
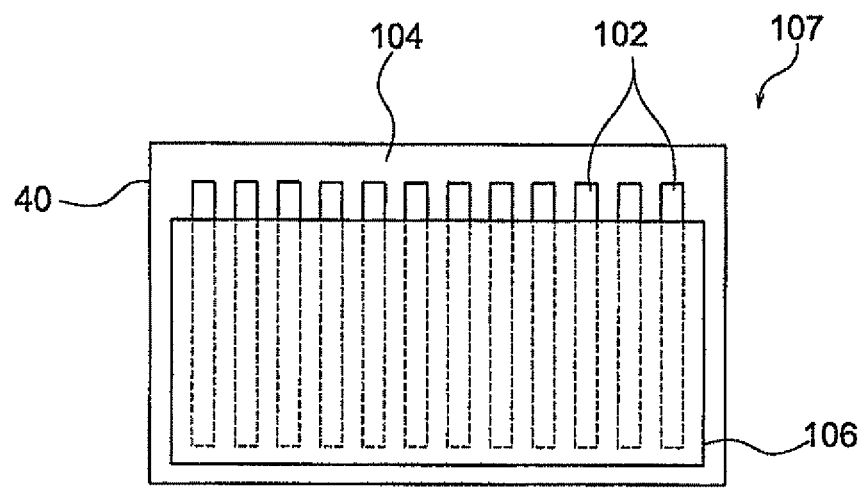

FIG. 12 is a plane view of an antidust filter included in an optical device according to a second embodiment of the present invention.

FIG. 13(A) to 13(E) are schematic cross sectional views showing a manufacturing process of the antidust filter shown in FIG. 12.

Figure 14:
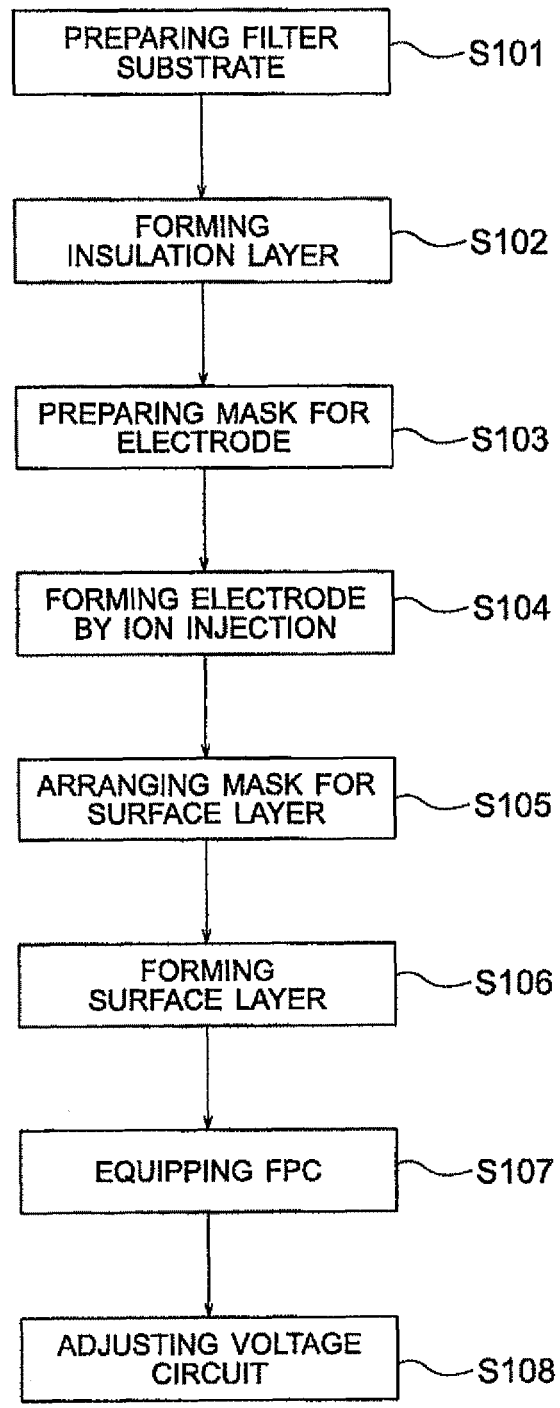

FIG. 14 is a flow chart showing a manufacturing process of the antidust filter according a second embodiment of the present invention.

Figure 15:
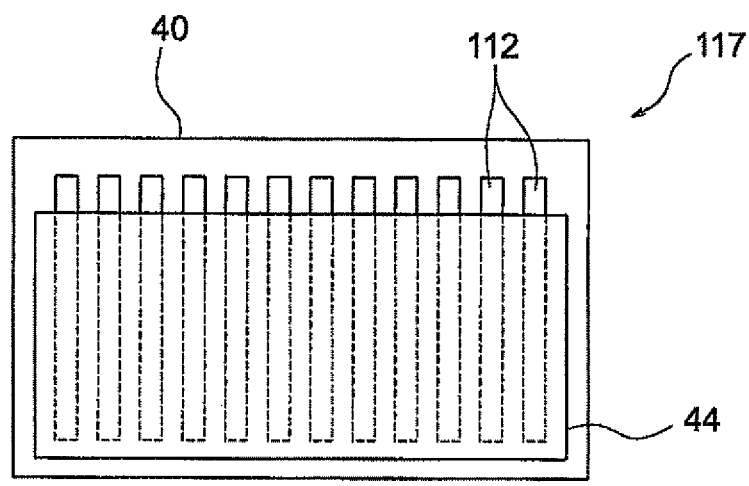

FIG. 15 is a plane view of an antidust filter included in an optical device according to a third embodiment of the present invention.

FIG. 16(A) to 16(D) are schematic cross sectional views showing manufacturing process of the antidust filter shown in FIG. 15.

Figure 17:
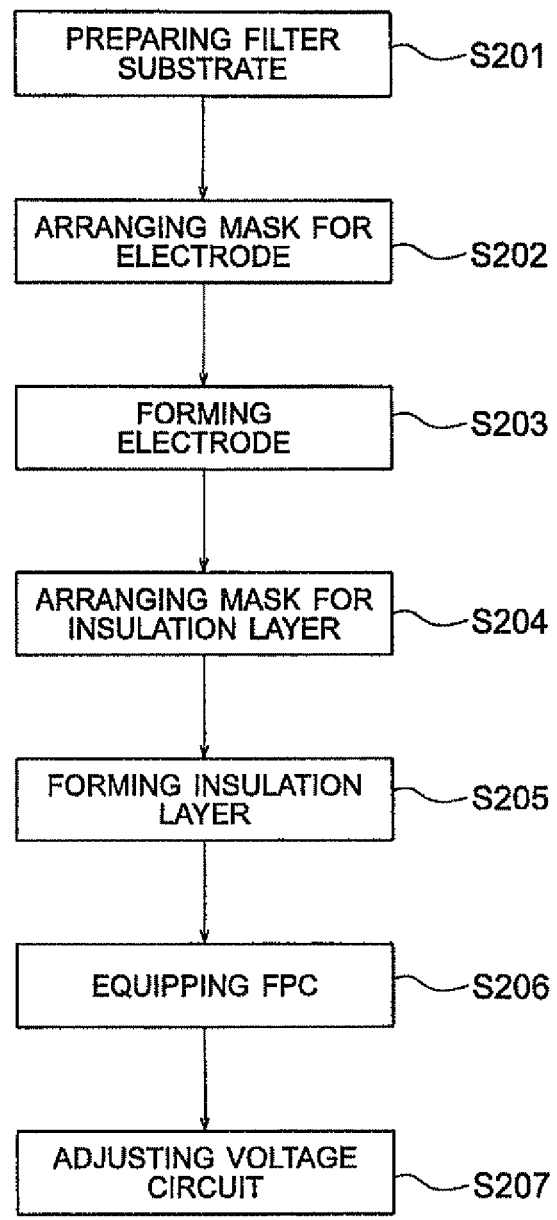

FIG. 17 is a flow chart showing a manufacturing process of a antidust filter included in the optical device according to the third embodiment of the present invention.

Figure 18:
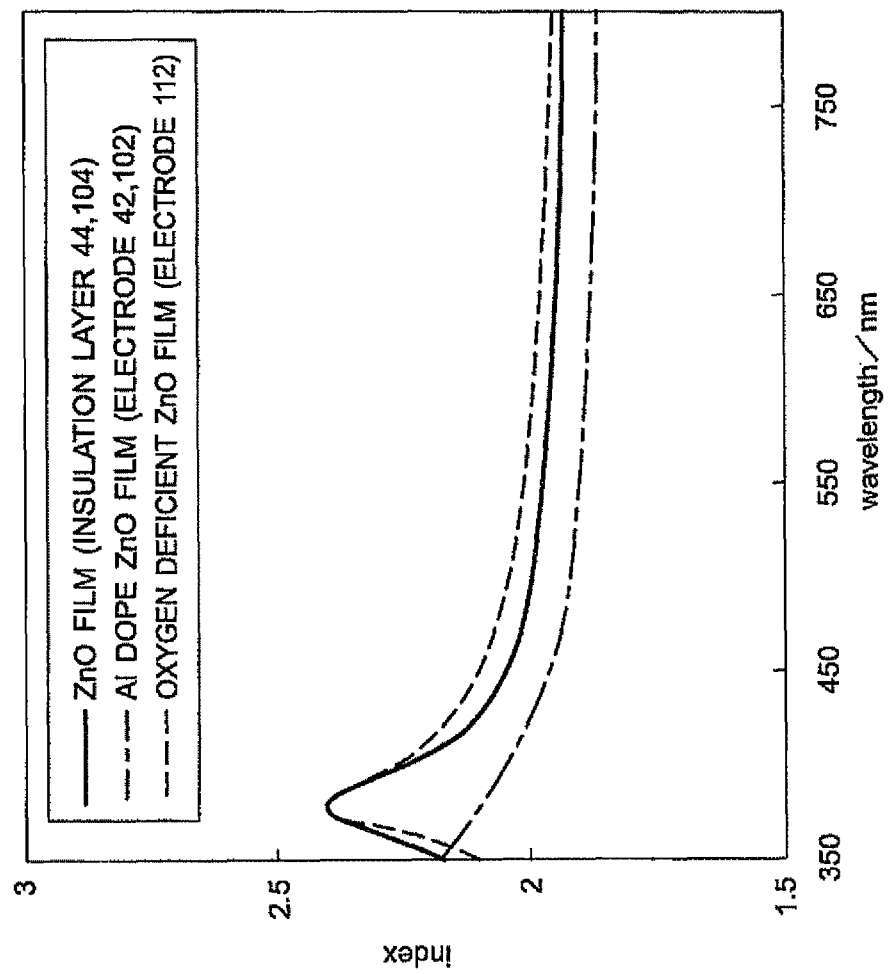

FIG. 18 is a graph showing a relation of a wave length and a refractive index of incoming light at an insulation portion and electrode portion of the antidust filter according to the first to third embodiment.

Figure 19:
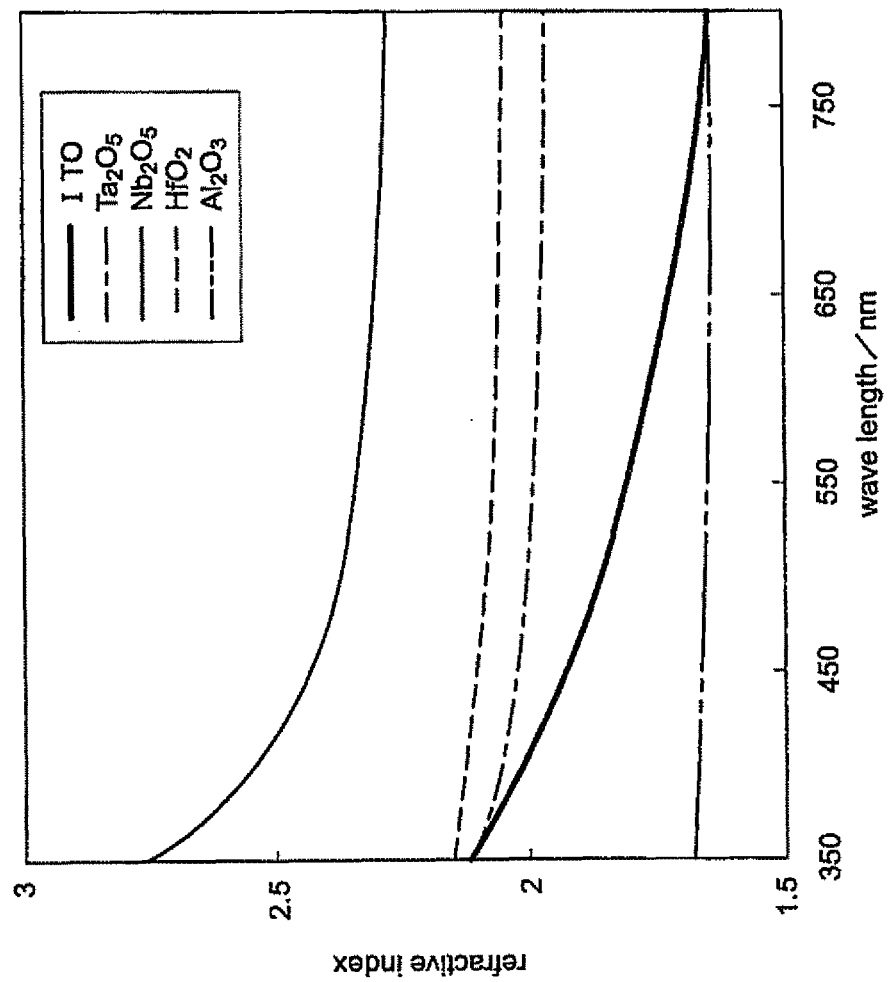

FIG. 19 is a graph showing a relation of a wave length and a refractive index of ITO and insulating materials having comparatively near refractive index of ITO.

EMBODIMENT FOR CARRYING THE INVENTION

A First Embodiment

Figure 1:
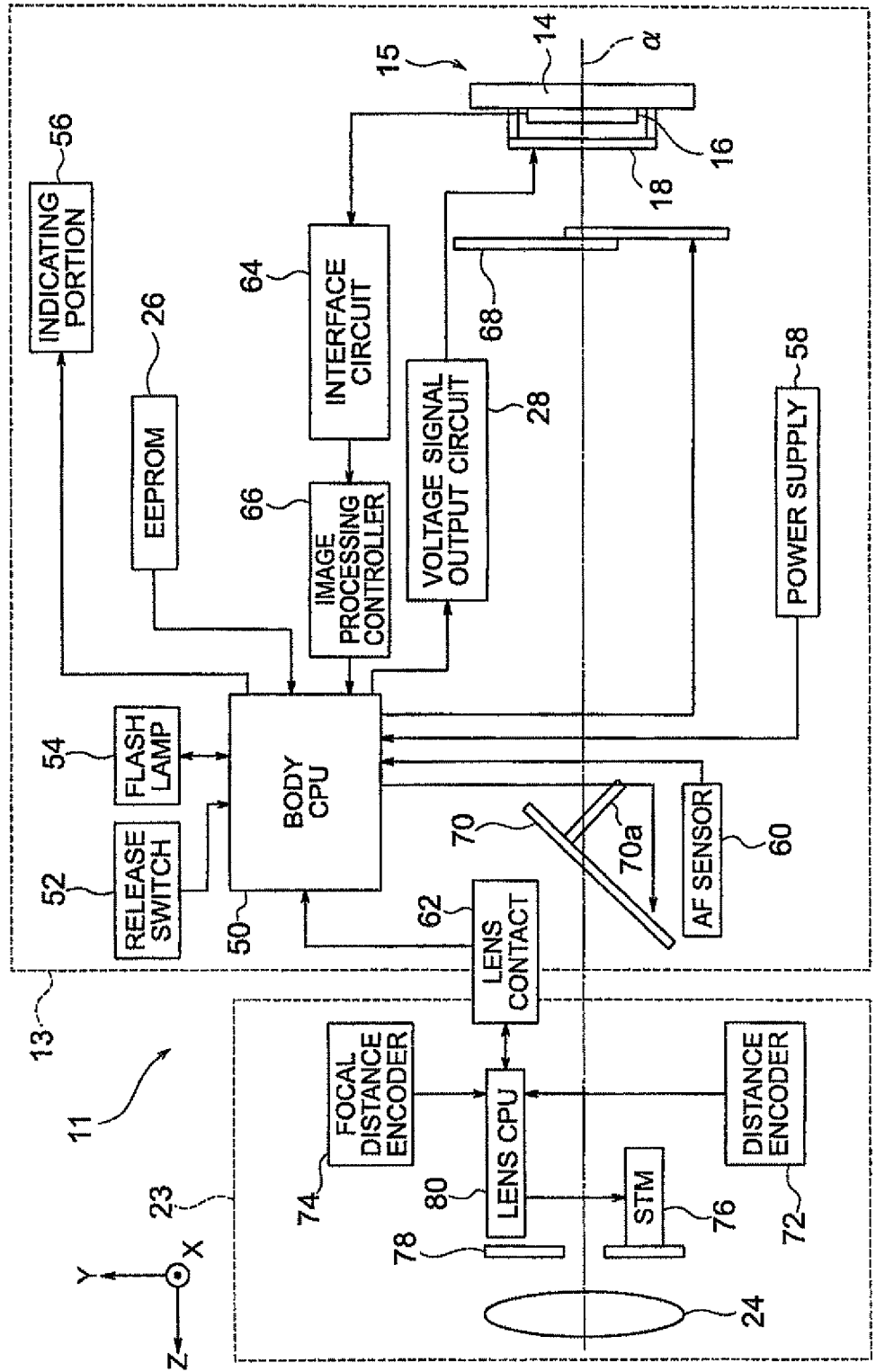
FIG. 1 is a block diagram of a whole camera to which an optical device according to one embodiment of the present invention is equipped.
Figure 2:
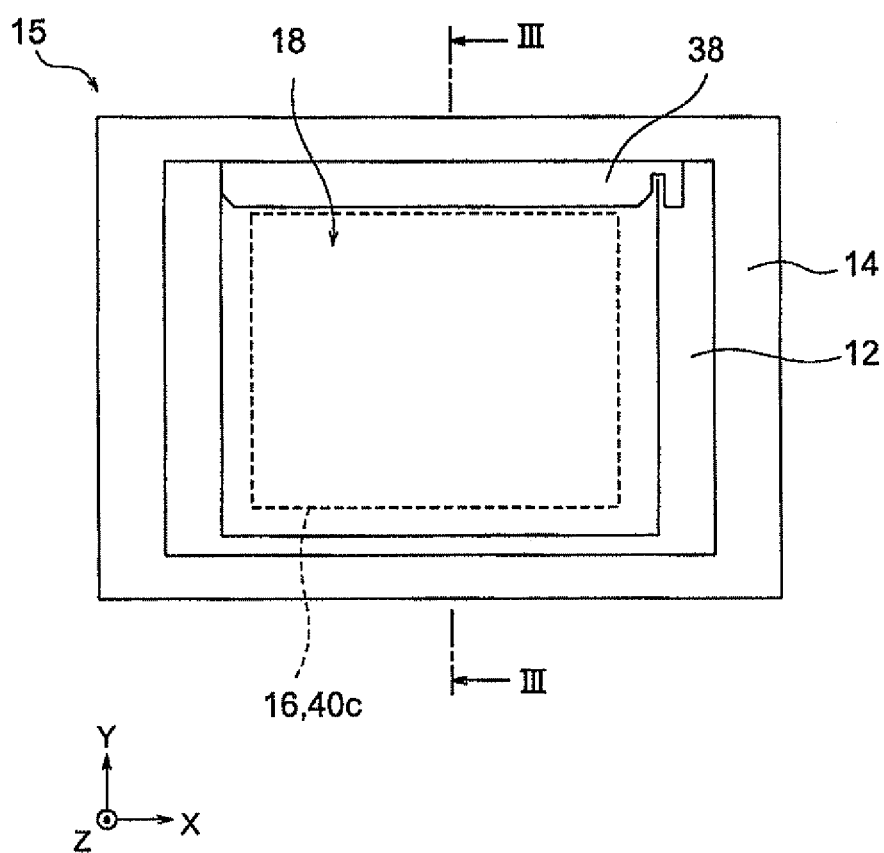
FIG. 2 is a plain view of a neighboring part of an image pick up element equipped to the camera shown in FIG. 1.

FIG. 1 is a whole block diagram of a camera 11 to which an optical device according to one embodiment of the present invention is equipped. The camera 11 comprises a camera body 13 and a lens barrel 23. The lens barrel 23 is equipped detachably to the camera body 13. Note that in the specification of the camera 11, as shown in FIG. 1, FIG. 2, etc., it will be specified that a direction from the lens barrel 23 to the camera body 13 which is about in parallel to an optical axis α is defined as a negative direction of a Z-axis, directions which are perpendicular to the Z-axis are defined as a X-axis direction and a Y-axis direction.

As a camera wherein the optical device according to the present invention is equipped, it is not limited to an interchangeable lens camera shown in FIG. 1, it may be a camera wherein the lens barrel 23 and the camera body 13 are integral, and types of camera are not particularly limited. Also, the optical equipment according to the present invention is not limited to a still camera, it can be applied to optical devices such as a video camera, a microscope, mobile phone and the like. Further, the optical device according to the present invention can be applied for a solar battery.

In the camera body 13 and the lens barrel 23, a plurality of optical components is arranged along a photo taking optical system optical axis α. An image pick up element neighbor portion 15 is arranged at a back side (Z-axis negative direction side) in the camera body 13 shown in FIG. 1, a shutter 68 is arranged in front of the optical axis α direction of the image pick up element neighbor portion 15 (Z-axis positive direction side). A mirror 70 is arranged in front of the optical a direction of the shutter 68, a diaphragm portion 78 and an optical lens group 24 contained within the lens barrel 23 are arranged in front of the mirror 70.

A body CPU 50 is contained within the camera body 13. The body CPU 50 is connected to a lens CPU 80 via a lens contact 62. The body CPU 50 comprises a communication function with the lens barrel 23 and a control function of the camera body 13. The lens contact 62 causes electrically connecting the body CPU 50 and the lens CPU 80. A power supply 58 is connected with the body CPU 50 so as to supply electric power to electrical components equipped in the camera body 13 and the lens barrel 23.

A release switch 52, a flash lamp 54, an indicating portion 56, EEPROM (memory) 26, an image processing controller 66, AF senor 60, a voltage signal output circuit 28 and the like are connected to the body CPU 50. The image pick-up element unit 16 of the image pick-up element neighbor portion 15 is connected with the image processing controller 66 via an interface circuit 64. The image processing controller 66 and the interface circuit 64 enables to control an image processing taken by the image pick-up element 16 based on a signal from the body CPU 50. The image pickup element unit 16 comprises, for example, a solid-state image pickup element such as CCD and CMOS and the like.

The indicating portion 56 is composed of, mainly, a liquid crystal display device and the like, which displays output results, menu and the like. The release switch 52 is a switch for operating timing of shutter driving. The release switch 52 outputs a half pressing signal and a fully pressing signal to the body CPU 50. When the half pressing signal is input from the release switch 52, the body CPU 50 controls actions of preparing to capture an image such as AF controlling, AE controlling and the like, when the fully pressing signal is input from the release switch 52, the body CPU 50 controls exposure actions such as mirror up, shutter driving and the like.

The quick return mirror 70 is for showing an image to a finder at decision of picture composition, which eliminates from an optical line during exposure. The quick return mirror 70 is driven by a mirror driving portion (for example, DC motor) which is not shown in figures.

A sub-mirror 70a which introduces light to the AF sensor 60 is connected with the quick return mirror 70. The sub-mirror 70a eliminates from the optical line during exposure too.

A shutter 68 controls an exposure time. The shutter 68 is driven by a shutter driving portion (for example, DC motor) which is not shown in figures, on the basis of the controlling from the body CPU 50.

The AF sensor 60 is a sensor for conducting Auto focusing (AF). As for the AF sensor, normally, a CCD is used. The EEPROM 26 memorizes parameters and the like which are necessary for controlling by the body CPU 50, and outputs to the body CPU 50, if necessary.

A focal distance encoder 74, a distance encoder 72, a diaphragm portion 78, a driving motor 76 configured to drive the diaphragm portion 78, the lens CPU 80, the lens contact 62 and the optical lens group 24 are equipped in the lens barrel 23 shown in FIG. 1.

The lens CPU 80 comprises a communication function with the body CPU 50 and a control function of electronic components equipped in the lens barrel 23. For example, the lens CPU 80 outputs focal distance information, target distance information and the like to the body CPU 50 via the lens contact 62. Also, release information, AF information are input to the lens CPU 80 from the body CPU 50. The driving motor 76 and the like of the diaphragm 78 can be controlled based on the information by lens CPU 80.

The focal distance encoder 74 determines the focal distance from position information of a zooming lens group which is not shown and outputs thereof to the lens CPU 80. The distance encoder 72 calculates the subject distance from position information of a focusing lens group and outputs it to the lens CPU 80.

As shown in FIG. 1, the voltage signal output circuit 28 is equipped in the camera body 13. The voltage signal output circuit 28 outputs voltage to a plurality of electrode arranged on a filter portion 18 in the image pick up element neighbor portion 15 based on the control signal from the body CPU 50.

FIG. 2 is a plane view of the image pick up element neighbor portion 15 equipped in the camera 11 shown in FIG. 1. The image pick up element neighbor portion 15 comprises a unit fixing base plate 14, a case 12, a filter portion 18 and the image pick up unit 16. Also, the image pick up element neighbor portion 15 comprises a wiring portion 38 attached to the filter portion 18. As shown in FIG. 3 which is a cross sectional view of the image pick up element neighbor portion 15, the image pick up element 16 and the case 12 are arranged on a surface of the Z-axis positive direction side of the unit fixing base plate 14 having a rectangular plate shape. The image pick up element 16 is arranged in a status that an image pick up face 16a faces to the Z-axis positive direction side. The case 12 has an architrave shape and is arranged as enclosing a peripheral of the image pick up element unit 16. The case 12 is formed by using a material having insulating property such as synthetic resin, ceramics and the like.

A mounting portion 12a so as to mount the filter portion 18 is formed on an internal circumferential face of the case 12. The filter portion 18 has a rectangular shape and is designed that a peripheral of the filter portion 18 contacts with the mounting portion 12a. The filter portion 18 is mounted to the case 12 by, for example, adhesive bonds and the like. The image pick up unit 16 is provided as facing to the filter portion 18, and a light passes through the filter portion 18 is input to an image pick up face 16a of the image pick up element unit 16.

As shown in FIG. 3, a peripheral of the image pick up element unit 16 is sealed by the unit fixing base plate 14, the case 12 and the filter portion 18. The image pick up element neighbor portion 15 shown in FIG. 3 prevents invasion of dust and the like to sealing space which receives the image pick up element unit 16. Note that, the image pick up element neighbor portion 15 shown in FIG. 3 may remove dust adhered to said filter portion 18 without vibrating the filter portion 18 which is mentioned as follows. Thus, the filter portion 18 is fixed to the case 12 without movably, and a mounting constitution of the filter portion 18 to the case 12 is simple. Also, the sealed space which receives the image pick up element unit 16 is certainly sealed by the filter portion 18, the case 12 and the unit fixing base plate 14.

The filter portion 18 has a multilayer structure which is composed of a four multi layered filters wherein an antidust filter 36, an infrared ray absorbing glass plate 32, a crystal wavelength plate 34 and a second birefringence plate 30 are laminated. As for a laminating method, it may be adhesive bond laminating or other laminating method, As shown in FIG. 4(A), although the filter portion 18 according to the present embodiment is formed by laminating four filter having an about identical area, as for shape of the filter portion 18, it is not limited thereto. For example, in a filter portion 18 according to an alternate embodiment shown in FIG. 4(B), an area of one filter (the second birefringent plate 30) is larger than other three filters 36, 32, 34. Also, in a filter portion 18 according to an alternate embodiment shown in FIG. 4(C), one filter (the antidust filter 36) becomes an individual body from the other three filters 32, 34, 30.

The crystal wavelength plate 34 shown in FIG. 3 is an optical plate which is available to change a linearly polarized light to a circularly polarized light, the infrared ray absorbing glass plate 32 has function to absorb an infrared ray. Also, the antidust filter 36 is a birefringent plate (a first birefringent plate) whose birefringent direction is mutually different at 90 degree with the second birefringent plate 30, when one is a birefringent plate having 90 degree birefringent direction (a short side direction), other birefringent plate is a birefringent plate having 0 degree birefringent direction (a long side direction). In the present embodiment, although the antidust filter 36 is a birefringent plate having 0 degree birefringent direction (a long side direction), the second birefringent plate 30 is a birefringent plate having 90 degree birefringent direction (a short side direction), it may be reversed.

In the present embodiment, an optical low pass filter (OPLF) is basically composed of the antidust filter 36 and the second birefringent plate 30 at the filter portion 18. Note that, generally the optical low pas filter (OPLF) is composed by that the infrared ray absorbing glass plate 32 and the crystal wavelength plate 34 are laminated between two birefringent plates 36 and 30.

The antidust filter 36 and the second birefringent plate 30 are produced by using a crystal plate which is cut out from a crystal with a specific angle. A raw material crystal may be either an artificial crystal or a natural crystal.

FIG. 5 are a cross sectional view (FIG. 5(A)) and a plane view (FIG. 5(b)) of an antidust filter 36 which is equipped at the image pick up element neighbor portion 15 shown in FIG. 3. As shown in FIG. 5(a), the antidust filter 36 comprises a filter substrate 40, a plurality of electrodes 42 and an insulation layer 44. The filter substrate 40 has a rectangular shape and a light passing area 40c which is available to pass through a light towards to the image pick up element unit 16 provided at the Z-axis negative direction side. The filter substrate 40 at the antidust filter 36 is a birefringent plate having birefringent property.

As shown in FIG. 5(A), the plurality of electrodes 42 and the insulation layer 44 are formed on a surface of the Z-axis positive direction side of the filter substrate 40. The electrodes 42 and the insulation layer 44 are formed by a material which passes light. For example, the electrode, 42, the insulation layer 44 and the filter substrate 40 preferably have 80% or more and 100% or less transmittance values at whole area of an input visible light (for example, light having wavelength which is 0.38 μm or more, 0.75 μm or less). Because, it can be obtained a sufficient optical property for obtaining captured images such as still image, motion picture and the like, when the transmittance value is 80% or more and 100% or less. More preferably, the electrode 42, the insulation layer 44 and the filter substrate 40 have 90% or more and 100% or less the transmittance value at whole area of an input visible light. When the transmittance value is 90% or more and 100% or less, sufficient optical property for obtaining high definition still image of captured images can be obtained.

Also, when amount of light is decreased, which is reached to the image pick up element unit 16 by the light passes through the electrode 42, the insulation layer 44 and the filter substrate 40, the amount of light of the captured image may be increased substantially by processing (analogue processing or digital processing) a signal obtained by the image pick up element unit 16.

The electrode 42 is formed on whole surface of the filter substrate 40 which includes light passage area 40c, and generates an electric field to remove dust adhered to a surface of the antidust filter 36 which is mentioned as follows. As shown in FIG. 5(B), the respective electrodes 42 are formed as stripe shape along with the surface of the filter substrate 40 in a status sandwiching the insulation layer 44 between the neighboring electrodes 42. In the antidust filter 36 according to the present embodiment, the electrode 42 is formed as extends to a direction which is an about parallel to a short side 40b of the filter substrate 40. Note that, the electrode 42 is provided about parallel to the image pick up face 16a of the image pick up element unit 16 shown in FIG. 3. By arranging the electrode 42 substantially parallel to the image pick up face 16a, a light passing area 40c (FIG. 2) can be covered efficiently by the electric field of the electrode 42 which is mentioned as follows.

The plurality of the electrode 42 is arranged with spaces along with a long side 40a of the filter substrate 40 so that for example, a pitch is a predetermined length d1 and respective spaces become a length d2 (FIG. 5(B)). As shown in FIG. 5(B), a wiring portion 38 is attached to one end portion of the respective electrode 42 (end portion of a Y-axis positive direction side in the present embodiment), and the electrodes 42 are electrically connected to the voltage signal output circuit 28 shown in FIG. 1 through the wiring portion 38. Although the wiring portion 38 according to the present embodiment is FPC, it is not particularly limited if conducting the voltage signal to the electrode 42.

Also, the plurality of electrodes 42 is constituted by a plurality of groups to which AC voltage having different phases respectively are applied. Namely, the plurality of the electrodes 42 in the present embodiment are composed of first group electrodes 42a to which a first voltage signal is input, second group electrodes 42b to which a second voltage signal is input, third group electrodes 42c to which a third voltage signal is input and fourth group electrodes 42d to which a fourth voltage signal is input.

The electrodes 42a, 42b, 42c, 42d of the respective groups are arranged periodically with predetermined spaces along a X-axis direction which is perpendicular to the Y-axis direction which is a direction where the electrodes 42 extend to, in the order of the first group electrode 42a, the second group electrode 42b, the third group electrode 42c, the fourth group electrode 42d. Namely, between the one first group electrode 42a1 and one first group electrode 42a2 to which a same phase voltage signal is applied, one second group electrode 42b, one third group electrode 42c, one fourth group electrode 42d to which different voltage signals from the first group electrodes 42a are applied, are provided with spaces respectively. With respect to the second group electrodes 42b, the third group electrodes 42c, the fourth group electrodes 42d are similar with the first group electrodes 42a1, 42a2.

The antidust filter 36 according to the present embodiment comprises the insulation layer 44 which is provided on a surface of a Z-axis negative direction side of the antidust filter 36 to cover a surface of the electrode 42 (FIG. 5(A)). The insulation layer 44 is provided so as to sandwich the electrode 42 with the filter substrate 40. The insulation layer 44 is formed by a light passing material as similar with the electrode 42.

Here, the electrode 42 according to the present invention has a main component which is the same component of the insulation layer 44 and has electric resistance lower than that of the insulation layer 44. Namely, the main composition of the electrode 42 and the insulation layer 44 are either ZnO (zinc oxide). However, because the electrode 42 is composed of ZnO to which Al (aluminum) is added, the electric resistance is lower with respect to the insulation layer 44 which is composed by ZnO.

Because the electrode 42 comprises the main component which is the same main component of the insulation layer 44, the refractive index and its dispersion of the electrode 42 (refractive index change by light wave length) is very close to the refractive index and its dispersion of the insulation layer 44. Therefore, the antidust filter 36 according to the present embodiment comprises the electrode 42 and the insulation layer 44 wherein their optical properties are similar with each other, it can prevent unwanted reflection of a shadow of the electrode 42 to the image taken by the image pick up element unit 16. Because, a difference of a reflection ratio and a transmittance generated on the electrode 42 and the insulation layer 44 can be reduced.

Below, one example of manufacturing method of an optical device according to the present invention will be specified by using FIG. 7(A) to FIG. 11. FIG. 7(A) to FIG. 7(D) are schematic cross sectional views showing manufacturing process for the antidust filter 36 shown in FIG. 5 and FIG. 11 is a flow chart showing manufacturing process for an optical device including the antidust filter 36.

Figure 7A:
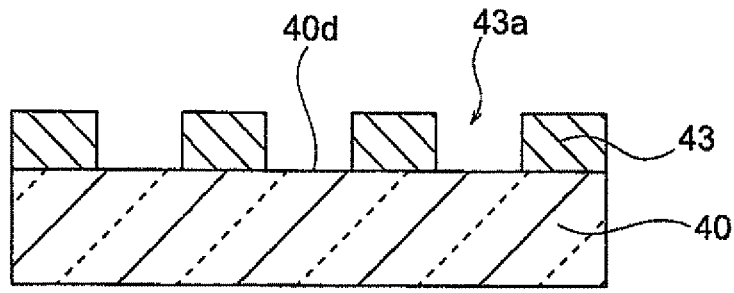

In a manufacturing process of the optical device according to the present embodiment, at first, the antidust filter 36 is produced (step S001 to step S005 in FIG. 11). In the step S001 shown in FIG. 11, the filter substrate 40 is prepared, and in the step S002, a mask for electrode 43 is arranged on the surface of the filter substrate 40. FIG. 7(A) is a cross sectional view showing a status in which the mask for electrode 43 is arranged on a surface of the filter substrate 40 in the step S002.

As shown in FIG. 5(A) and the like, although the filter substrate 40 is a birefringent plate having birefringent property, as for the filter substrate 40 in the antidust filter 36, it is not limited thereto. For example, in case that the antidust filter 36 is composed of a different optical member from the optical low pass filter, the filter substrate 40 may be other transparent member such as a glass plate and the like. Also, a shape of the filter substrate 40 is not limited to a rectangular shape, for example, it may be other shapes such as a circular plate shape and the like.

Also, FIG. 8 is a plane view of the mask for electrode 43 arranged on the filter substrate 40. The mask for the electrode 43 has an area which is an about identical to the filter substrate 40 and includes a through hole 43a which corresponds to a shape and arrangement of the electrode 42. As for the mask for electrode 43, for example, it may be a metallic mask and the like in which the through hole 43a is formed before arranged on the filter substrate 40 and a photo mask and the like in which the through hole 43a is formed after arranged on the filter substrate 40.

In a step S003 shown in FIG. 11, the electrode 42 is formed by a thin film formation process on the filter substrate 40 in which the mask for electrode 43 is arranged. Although a forming method of the electrode 42 is not particularly limited, the electrode 42 is formed by, for example, sputtering. Note that, PVD (Physical Vapor Deposition) method other than sputtering may be used.

When forming the electrode 42 on the filter substrate 40 by sputtering, the filter substrate 40 in which the mask for electrode 43 is arranged, is attached to a film formation portion of a sputtering device. At this time, the filter substrate 40 is set so that a face 40d (refer to FIG. 7(A)) of side to which the mask for electrode 43 is arranged becomes a film forming face of surfaces of the filter substrate 40. As for a target used for film forming in the sputtering device, ZnO target composed of ZnO and Al target composed of Al are used.

By using ZnO target and Al target, the electrode 42 composed of ZnO film in which Al is doped(hereinafter referred as Al dope ZnO film in which Al is doped in ZnO film) can be formed on the surface of the filter substrate 40. Because the Al dope ZnO film is n type electric conductivity, the Al dope ZnO film has lower electric resistivity than ZnO film in which Al is not doped (hereinafter referred as ZnO film in which Al is not doped). Note that, preferable metallic element target such as Ga target composed of Ga, In target composed of In may be used too, instead of Al target, even in these cases, similar effects can be obtained. Also, a film forming for forming the electrode 42 is made until a thickness of the electrode (cross sectional area at ZX plane) becomes a predetermined thickness. Because a resistance value of the electrode 42 can be adjusted by the thickness of the electrode 42.

An input power to ZnO target and an input power to Al target during film forming is adjusted so that the electric resistivity of the electrode 42 formed on the surface of the filter substrate 40 become smaller than a predetermined value. For example, the input power to ZnO target and Al target is preferably adjusted so that the electric resistivity of electrode 42 becomes $1.0 \times 10^{-5}$ Ωm or less. By making the electric resistivity of the electrode 42 is $1.0 \times 10^{-5}$ Ωm or less, the electrode 42 can perform function of electrode so as to change an electric field of the surface of the antidust filter 36

The input power to ZnO target and Al target during film forming is preferably adjusted so that Al contents in the electrode 42 (Al dope ZnO film) becomes 1.2 atomic % to 5 atomic %, more preferably adjusted as become 3.0 atomic % to 4.0 atomic %. An function of electrode to cause changing an electric field of the surface of the antidust filter 36 can be achieved preferably, because the electric resistance becomes lower value, because Al contents of the electrode 42 exceeds a lower limit value. Also, it can be prevented that a difference of an optical property to the insulation layer 44 composed by ZnO film becomes too large as well as transparency of the electrode 42 becomes too low, because Al contents included in the electrode 42 falls below the upper limit value.

As shown in FIG. 5(A), a pitch d1 of the electrode 42 which is formed on the surface of the filter substrate 40 maybe designed appropriately in response to properties of the dust 37 having high possibility of adhering to the antidust filter 36, for example, it can be 200 μm to 1000 μm (1 mm) or so. Also, although a space d2 between neighboring electrodes is not particularly limited, for example, it can be 200 μm to 1000 μm (1 mm) or so.

Figure 7B:
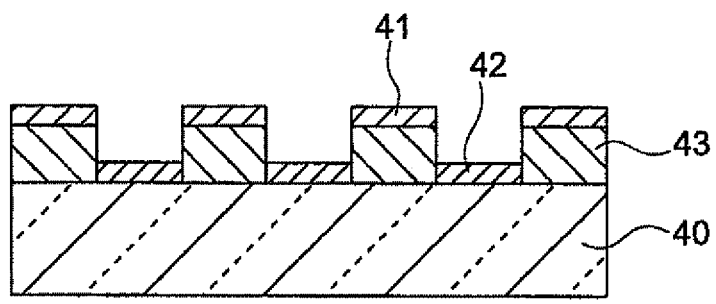
Figure 7C:
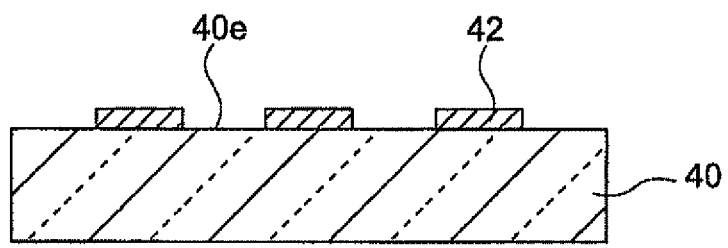

In the sputtering at a step S003 (FIG. 11), as shown in FIG. 7(B), although a removal layer 41 composed of Al dope ZnO film is formed on the surface of the mask for electrode 43, the removal layer 41 is removed with the mask for electrode 43. In the step S003, the mask for electrode 43 is detached from the filter substrate 40 after film forming so that the filter substrate 40 (FIG. 7(C)) in which the electrode is formed on the surface is obtained.

In a step S004 shown in FIG. 11, a mask for insulation layer 45 (FIG. 9) is arranged on the filter substrate 40 in which the electrode 42 is formed on the surface. The mask for insulation layer 45 is arranged on a face 40e which is a side where the electrode 42 is formed in the surfaces of the filter substrate 40.

As shown in FIG. 9, the mask for insulation layer 45 has a through hole 45b at a position where an insulation layer is formed on the filter substrate 40. Also, the mask for insulation layer 45 has a mask portion for wiring 45b. The mask portion for wiring 45b covers an end portion of Y-axis positive direction side which is one tip end of the electrode 42 so as not to form an insulation layer at the end portion of Y-axis positive direction of the electrode 42. Thereby, in the assembling process and the like of the antidust filter 36, the electrode 42 and the wiring portion 38 can easily be conducted by attaching a wiring portion 38 to the electrode 42. Note that, although the mask for insulation layer 45 can be composed of a metallic mask and the like, it is not particularly limited.

Figure 7D:
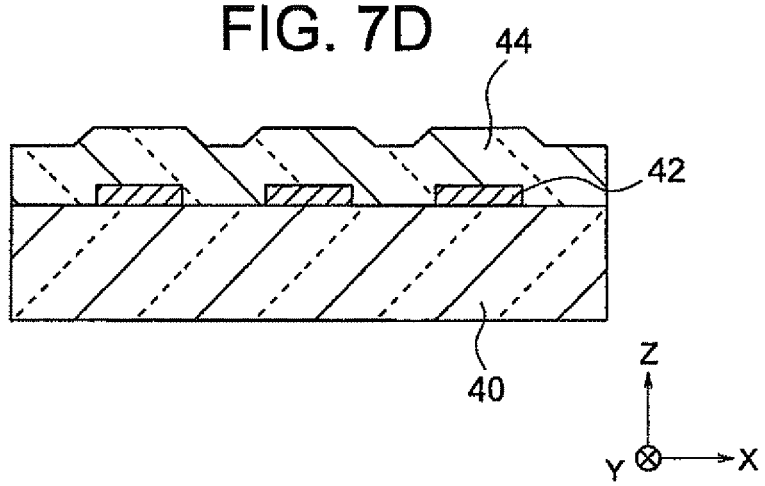

In a step S005, an insulation layer 44 is formed on the filter substrate 40 in which the electrode 42 is formed and the mask for insulation layer 45 is attached (FIG. 7(D)). Although a forming method for the insulation layer 44 is not particularly limited, for example, the insulation layer 44 can be formed by sputtering as similar with the electrode 42. Note that, PVD (Physical Vapor Deposition) method other than sputtering may be used.

When making the insulation layer 44 by sputtering, the filter substrate 40, in which the electrode 42 is formed and the mask for insulation layer 45 is arranged, is attached to a film forming portion of a sputtering device. At this time, the filter substrate 40 is set so that a face 40e of side in which the electrode 42 is formed and the mask for insulation layer 45 is attached becomes a film forming face of surfaces of the filter substrate 40. As for a target used for film forming in the sputtering device, ZnO target composed of ZnO is used.

By using ZnO target, the insulation layer 44 composed of the ZnO film is formed on the surfaces of the filter substrate 40 and the electrode 42. Because composition of the ZnO film formed in the step S005 is almost stoichiometry, electric resistivity is higher than Al dope ZnO film. Thus, the insulation layer 44 composed of the ZnO film acts as an insulation portion to insulate the adjusted electrodes 42 electrically, when changing an electric field of the surface of the antidust filter 36 by the electrodes 42. Electric resistivity of the insulation layer 44 preferably becomes $1 \times 10^6$ Ω·cm or more. The insulation layer 44 preferably acts as an insulation portion to insulate the electrodes 42 electrically, because electric resistivity becomes $1 \times 10^6$ Ω·cm and the like. Note that, the mask for insulation layer is removed from the filter substrate 40 after forming the insulation layer 44.

FIG. 10 is a plane view of the antidust filter 36 produced by continuous process shown in FIG. 11. The antidust filter 36 is composed of the filter substrate 40, the electrode 42 and the insulation layer 44 formed on one side surface of the filter substrate 40. The electrode 42 is covered by the insulation layer 44 except for a portion to which the wiring portion 38 shown in FIG. 6 is attached. As show in FIG. 7(D) which is a cross section view of the antidust filter 36, the electrode 42 composed of Al dope ZnO film is arranged on a surface of Z-axis positive direction side of the filter substrate 40 with sandwiching one portion of the insulation layer 44 which is composed of ZnO film along X-axis direction.

Because main component of the electrode 42 and the insulation layer 44 are either ZnO which is an identical, refractive index and its dispersion of the electrode 42 and the insulation layer 44 become very close values. Namely, the antidust filter 36 according to the present embodiment can prevent unwanted reflection of a shadow of the electrode 42 to the image taken by the image pickup element unit 16 because the electrode 42 and the insulation layer 44 have similar optical properties. Also, in spite of an optical property of the electrode 42 and the insulation layer 44 are close, electric resistivity of them is different from each other, the electrode 42 can act as a conducting portion preferably having conductivity, and the insulation layer 44 can act as an insulation portion preferably having insulation property.

In a step S006 shown in FIG. 11, the wiring portion 38 shown in FIG. 5(B) is attached to the antidust filter 36. The electrode 42 and the voltage signal output circuit 28 (FIG. 1) are electrically connected via the wiring portion 38.

In a step S007, the voltage signal output circuit 28 (FIG. 1) is adjusted so as to output a periodical voltage to the electrode 42. An oscillation to be output to the electrode 42 may be designed appropriately in response to properties of the dust 37 having high possibility to adhere with the antidust filter 36 and the pitch d1 of the electrode 42 and the like, for example, it can be 100 Vp-p~2 kVp-p.

FIG. 6 is a schematic view for explaining dust removing performance by using the antidust filter 36. The voltage signal output circuit 28 has a signal generating portion 82, a phase adjusting portion 84, an amplifying portion 86. The signal generating portion 82 generates AC voltage signals with predetermined cycle and outputs it to the phase adjusting portion 84. The phase adjusting portion 84 performs adjusting a phase of AC voltage signals, and generates four AC voltage signals which having different phases each other and outputs to the amplifying portion 86.

The amplifying portion 86 amplifies the four AC voltage signal to predetermined amplitude, then, outputs as driving voltage signals. The amplifying portion 86 outputs the driving voltage signals to the electrodes 42 which is equipped to the antidust filter 36 through the wiring portion 38. Thus, the voltage signal output circuit 28 may output a first driving voltage signal ch1, a second driving voltage signal ch2, a third driving voltage ch3 and a fourth driving voltage signal ch4 which are different phases each other to the electrode 42 equipped to the antidust filter 36.

The wiring portion 38 comprises a first wiring portion 38a which conducts the first driving voltage signal ch1 to the first group electrodes 42a, a second wiring portion 38b which conducts the second driving voltage signal ch2 to the second group electrodes 42b, a third wiring portion 38c which conducts the third driving voltage signal ch3 to the third group electrodes 42a, a fourth wiring portion 38d which conducts the fourth driving voltage signal ch4 to the fourth group electrodes 42d.

Although the first to the fourth driving voltage signals ch1 to ch4 are square waves which shift quarter alterations, voltage signals to be output to the electrode 42 are not limited thereto, they may be signals such as a sine wave and triangular wave. Although frequencies of the first to the fourth driving voltage signals ch1 to ch4 are not particularly limited, for example, dust can be efficiently moved by setting 1 Hz to 500 Hz The voltage signal output circuit 28 can change an electric field of a surface of the antidust filter 36 by applying voltage to the plurality of electrodes 42 equipped on the surface of the antidust filter 36. The antidust filter 36 according to the present embodiment may generate an electric field of travelling waves on the surface of the antidust filter 36, because the electrodes 42 which passing through the light are arranged as stripe pattern and four phase AC voltage are applied to the electrodes 42.

Namely, the electrodes 42a, 42b, 42c and 42d of each group are arranged periodically on the surface of the antidust filter 36 along the X-axis direction, the driving voltage signals ch1, ch2, ch3 and ch4 corresponding respectively are applied to the electrodes 42a, 42b, 42c and 42d of each group. Thereby, the electric field of travelling waves which moves along the X-axis direction occur on the surface of the antidust filter 36, the dust 37 exists on the surface of the antidust filter 36 is moved by the electrostatic force interacted by the electric field, and removed. For example, the dust 37 adhered on the surface of the antidust filter 36 is moved to a direction along the electric field of travelling waves moving direction, for example as shown by an arrow 39, and is removed from the surface of the antidust filter 36.

Although the four phase driving voltage signals are applied to the electrodes 42 according to the present embodiment, the driving voltage signal applied to the electrodes 42 according to the present invention may be a single phase or two phase. Even in the case of a single phase, the dust exists on the surface of the antidust filter 36 can be moved by changing the electric field on the surface of the antidust filter 36. Also, in the case of two phase or more, the dust exists on the surface of the antidust filter 36 can be moved by moving the electric field on the surface of the antidust filter 36.

However, the driving voltage signal applied to the electrodes 42 are preferably three phase or more. The electric field of travelling wave can be generated easily on the surface of the antidust filter 36 by applying AC voltage signals having different phases respectively corresponding to the respective groups to the electrodes 42 which is composed by three or more group periodically arranged (in the present embodiment, it is composed of the first electrode 42a to the fourth electrode 42d). A moving direction controlling of the dust 37 becomes easier by generating the electric field of travelling waves, also, the dust 37 can be shifted strongly by comparatively small voltage. Note that, in the embodiments shown in drawings, it has been specified with an example of using 4 groups electrodes, however, the electrode group may be 2 groups, 3 groups, 5 groups or more.

An optical device according to the present embodiment removes dust adhered to the surface of the antidust filter 36 by shifting with changing electric fields. Due to forces given to the dust by the electrical fields are proportional to the charging amount of the dust under a predetermined condition, the optical device according to the present embodiment can remove the dust having large charging amount which has been hard to remove by a method of generating physical oscillation to an antidust filter.

Also, due to the optical device according to the present embodiment shifts the dust by electrical forces, it is possible to remove a dust of small mass which has been hard to remove by a method of generating physical oscillation to an antidust filter. Also, the optical device according to the present embodiment has excellent silence, because it is possible to remove the dust without generating physical generation. Further, it is not likely to raise the dust by the antidust filter 36 itself.

Due to the optical device according to the present embodiment shifts the dust by electrical force, it is not necessary to provide the antidust filter 36 with oscillation possible status which is different from a conventional art for removing the dust with generating physical oscillation. Thus, because the filter portion 18 including the antidust filter 36 can be equipped to the case 12 without movably, it is possible to prevent invasion of the dust from a gap between the filter 18 and the case 12 efficiently to the sealing space. Further, it is not necessary to equip the antidust filter with intervening elastic member and the like to the case 12, there is no risk to change the dust removing property of the antidust filter 36 by aged deterioration of the elastic member and the like.

Further, in the antidust filter 36 according to the present embodiment, due to the electrode 42 comprises a main component which is the same maim component of the insulation layer 44, a refractive index and its dispersion of the electrode 42 (refractive index change by light wave length) is very close to the refractive index and its dispersion of the insulation layer 44. Therefore, in the antidust filter 36, an optical property of the electrode 42 and the insulation layer 44 is similar with, thereby, difference of a reflectance and a transmittance at the electrode 42 and the insulation layer 44 portions is small. Thereby, the camera 11 including the antidust filter 36 can prevent unwanted reflection of a shadow of the electrode 42 to the image taken by the image pick up element unit 16.

Second Embodiment

FIG. 12 is a plane view of an anti dust filter 107 in an optical device according to a second embodiment of the present invention. Also, FIG. 13 is a schematic cross sectional view showing manufacturing process of the antidust filter 107 according to the second embodiment, FIG. 14 is a flow chart showing manufacturing process of the optical device including the antidust filter 107.

The optical device according to the second embodiment, a manufacturing method for an electrode 102 included in the antidust filter 107 is different from the electrode 42 included in the antidust filter 36 according to the first embodiment. Also, a shape and a manufacturing method of an insulation layer 104 included in the antidust filter according to the second embodiment is different from the insulation layer 44 included in the antidust filter 36 according to the first embodiment. Further, the antidust filter 36 according to the second embodiment comprises a coating layer 106. However, except for these different points, the optical device according to the second embodiment is similar with the optical device according to the first embodiment, with respect to similar portion with the optical device according to the first embodiment, explanation will be omitted.

As shown in FIG. 12, the antidust filter 107 comprises a filter substrate 40, an electrode 102 and an insulation layer 104 formed on one surface of the filter substrate 40 and a coating layer 106 to cover a part of the electrode 102 and the insulation layer 104. Although the electrode 102 included in the antidust filter 107 has functions almost similar with the electrode 42 included in the antidust filter 36 (FIG. 10) according to the first embodiment, a manufacturing method is different. Below, a manufacturing method for the optical device including the antidust filter 107 according to the second embodiment will be specified by using FIG. 13 and FIG. 14.

Figure 13A:
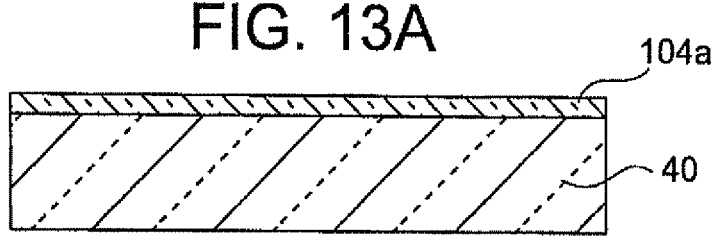

In the manufacturing method of the optical device according to the second embodiment, as similar with the first embodiment, at first, the antidust filter 107 is produced (step S101 to step S106 in FIG. 14). In the step S101 shown in FIG. 14, the filter substrate 40 is prepared, in a step S102, an insulation layer base portion 104a is formed by a thin film formation process at whole area of one surface (surface of Z-axis positive direction) of the filter substrate 40. FIG. 13(A) is a cross sectional view showing a status of forming the insulation layer base portion 104a on the surface of the filter substrate 40.

Although a manufacturing method for the insulation layer base portion 104a in the step S102 is not particularly limited, for example, the insulation layer base portion 104a can be produced by sputtering. Note that, the filter substrate 40 according to the present embodiment is a birefringent plate having birefringent property, as similar with the first embodiment. Note that, PVD (Physical Vapor Deposition) method other than sputtering may be used.

When forming the insulation layer base portion 104a on the filter substrate 40 by sputtering, the filter substrate 40 is attached to a film formation portion of a sputtering device. At this time, the filter substrate 40 is set so that a surface which is a side to which the insulation layer 104 and the electrode 102 to be arranged becomes a film forming surface of surfaces of the filter substrate 40. As for a target used for film forming in the sputtering device, ZnO target composed of ZnO is used.

By using ZnO target, the insulation layer base portion 104b composed of the ZnO film is formed on the surface of the filter substrate 40 (FIG. 13(A)). Because composition of the ZnO film formed in the step S102 is almost stoichiometry, electric resistivity is higher than Al dope ZnO film formed in the step S104.

Note that, in the manufacturing method for the antidust filter 107 according to the present embodiment, although the insulation layer base portion 104a composed of ZnO film is formed on whole surface of the filter substrate 40 about uniformly, as for the manufacturing method for ZnO film in the step S102, it is not limited thereto. Namely, the insulation layer base portion 104b may be formed so as to enclose a portion of the surface of the filter substrate 40 where the electrode 102 is formed in the step S104. In this case, when the insulation layer base portion 104b is formed on the filter substrate 40, an area to which the insulation layer base portion 104a is formed may be limited to one part of the surface of the filter substrate 40 by arranging an appropriate shape mask on the surface of the filter substrate 40.

Figure 13B:
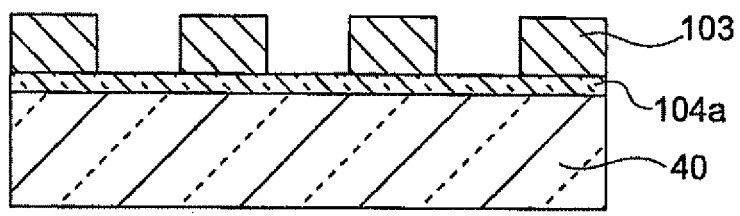

In a step S103, a mask for electrode 103 is arranged on the filter substrate 40 in which the insulation layer base portion 104a is formed on the surface (FIG. 13(B)). The mask for electrode 103 is arranged on a surface of the insulation layer base portion 104a. Note that, the mask for electrode 103 is similar with the mask for electrode 43 (FIG. 8) in the first embodiment.

In the step S104 shown in FIG. 11, the electrode 102 is formed by ion implantation. In the step S104, the filter substrate 40 (FIG. 13(B)) in which the mask for electrode 103 is arranged on the surface of insulation layer base portion 104a, is set to a chamber of an ion implantation device. At this time, the filter substrate 40 is arranged so that a face to which the mask for electrode 103 is equipped becomes an implantation face side. Thereby, ion implantation is performed to a portion corresponding to a through hole 103a of the mask for electrode 103 which is one part of the insulation layer base portion 104a.

As for element to be implanted into a target (a part of the insulation layer base portion 104b) by the ion implantation is preferably any one of selected from Al, Ga, In. Because the electric resistivity of ZnO film can be reduced by the ion implantation so as to cause dope an appropriate metal element to ZnO film. Note that, in the present embodiment, it will be explained as exemplified for Al ion implantation.

Figure 13C:
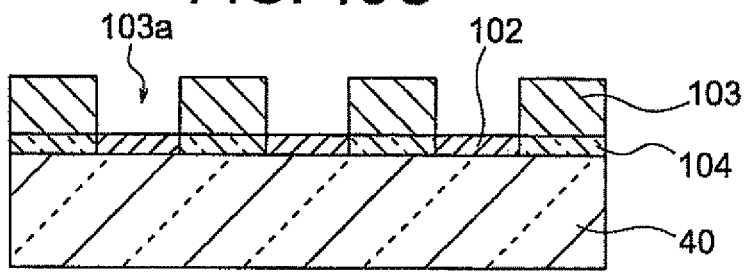

The electrode 102 composed of Al dope ZnO film (Al doped ZnO film) can be formed at a position which corresponds to the through hole 103a of the mask for electrode 103 which is a part of the insulation layer base portion 104a (FIG. 13(C)), by performing ion implantation of Al element. Also, a part of the insulation layer base portion 104a which is masked by the mask for electrode 103 becomes the insulation layer 104 composed of ZnO film, because Al is not doped by the ion implantation.

Condition of the ion implantation shall be made under condition that Al ion is injected about uniformly to a thickness direction of the insulation layer base portion 104a. Thereby, Al ion is injected to a portion which corresponding to the through hole 103a of the mask for electrode 103 which is one part of the insulation layer base portion 104a, and electric resistivity of this part is reduced so as to be the electrode 102.

Also, condition of the ion implantation is adjusted so that the electric resistivity of the electrode 102 becomes below a predetermined value. For example, injection volume of Al is preferably adjusted so that the electric resistivity of the electrode 102 becomes $1.0 \times 10^{-5}$ Ωm or less. By making the electric resistivity of the electrode 102 is $1.0 \times 10^{-5}$ Ωm or less, the electrode 102 can perform function of electrode so as to change an electric field of the surface of the antidust filter 107 preferably.

Further, condition of the ion implantation is preferably adjusted so that content of Al in the Al dope ZnO film to compose the electrode 102 becomes 1.2 atomic % to 5 atomic % and further preferably 3.0 atomic % to 4.0 atomic %. Because the electric resistivity of the electrode becomes lower value by exceeding Al contents of the electrode 102 exceeds a lower limit value, function of the electrode so as to change the electric field of the surface of the antidust filter 107 can be achieved preferably. Also, Al contents contained in the electrode 102 falls below an upper limit, it is possible to prevent that a difference of an optical property to the insulation layer 104 composed of ZnO film becomes too big and to prevent the transparency of the electrode 102 becomes too below. Note that, a pitch of the electrode 102 is similar with the pitch of the electrode 42 in the first embodiment.

Figure 13D:
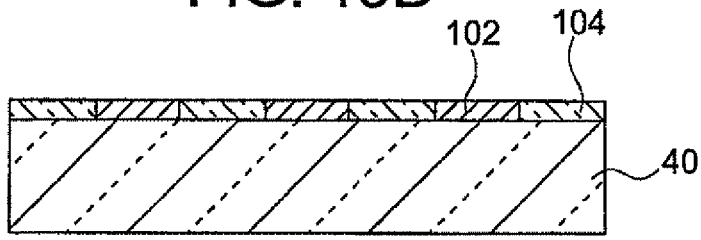

In the step S104, the mask for electrode 103 is removed after ion implantation and the filter substrate 40 in which the electrode 102 and the insulation layer 104 formed on the surface is obtained (FIG. 13(D)). As shown in FIG. 13(D), the electrode 102 composed of Al dope ZnO film is arranged on the surface of Z-axis positive direction side of the filter substrate 40 with sandwiching one portion of the insulation layer 44 which is composed of ZnO film along with X-axis direction. Note that, an appropriate anneal may be performed to the filter substrate 40 in which the electrode 102 and the insulation layer 104 are formed on the surface, after the ion implantation.

Because main components of the electrode 102 and the insulation layer 104 are either ZnO which is identical, a refractive index and its dispersion of the electrode 102 and the insulation layer 104 becomes very close value, as similar with a relation of the electrode 42 and the insulation layer 44 of the first embodiment. Namely, the antidust filter 107 according to the present embodiment can reduce a difference of the reflectance and transmittance at the electrode 102 and the insulation layer 104 portions can be reduced, because the optical properties of the electrode 102 and the insulation layer 104 are similar. Thereby, a camera including the antidust filter 107 can prevent reflection of a shadow of the electrode 102 to the image taken by the image pickup element unit. Also, in the relation between the electrode 102 and the insulation layer 104, in spite of the optical properties are close, electric resistivity is different, thus, the electrode 102 preferably acts as a conductive portion having conductivity, the insulation layer 44 preferably acts as an insulating portion having insulation property.

Further, due to the electrode 102 and the insulation layer 104 are formed on an identical insulation layer base portion 104a provided at the filter substrate 40, a face to which the electrode 102 and the insulation layer 104 are arranged and constituted thereby is flat. Thus, the surface of antidust filter 107 is flat after a surface layer 106 (FIG. 13(E)) is formed, there is a few gap to cause light scattering and the like, therefore, it can prevent reflection of a shadow of the electrode 102 to the image effectively.

Further, in the present embodiment, a part of ZnO film changes to Al dope ZnO film by doping Al to a part of the insulation layer base portion 104a composed of ZnO film which is same as the insulation layer 104 to form the electrode 102. Therefore, the electrode 102 and the insulation layer 104 constitute continuously advantageous one film, because there is a few deficiency which exist on a border of the electrode 102 and the insulation layer 104, light refraction and scattering at the boarder of the electrode 102 and the insulation layer 104 are inhibited. Therefore, the antidust filter 107 according to the present embodiment can prevent reflection of a shadow of the electrode 102 to the image effectively, in view of this point.

In a step S105, a mask for surface layer is arranged on the filter substrate 40 on which the insulation layer 104 and the electrode 102 are formed. The mask for surface layer is for masking a part of the electrode 102 so as not to cover a contact point to the wiring portion 38 by the surface layer 106, and has an identical shape with the mask for insulation layer 45 (FIG. 9) according to the first embodiment. The mask for surface layer is arranged on a face which is a side where the electrode 102 and the insulation layer 104 are formed.

Figure 13E:
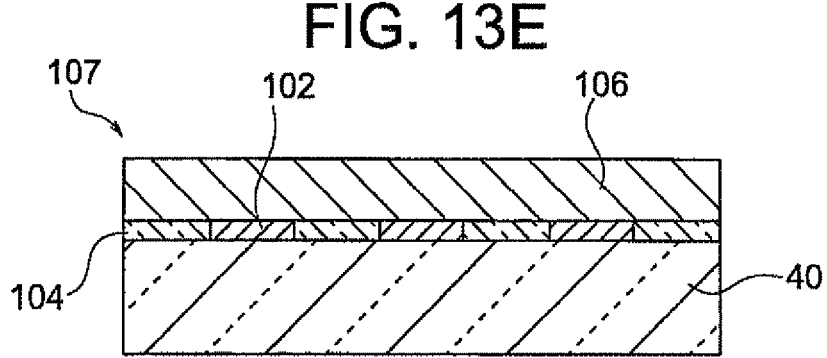

In a step S106, a surface layer 106 is formed to the filter substrate 40 and the like on which the mask for surface layer is arranged (FIG. 13(E)). Although a manufacturing method for the surface layer 106 is not particularly limited, the surface layer 106 may be formed by sputtering using a ZnO target, for example, as similar with the insulation layer base portion 104a (FIG. 13(A)). Note that, PVD (Physical. Vapor Deposition) method other than sputtering may be used. As shown in FIG. 13(E), because the surface of the electrode 102 is covered by the surface layer 106, the surface of the electrode 102 is protected, it is possible to prevent, for example, a short circuit of the adjacent electrodes 102 each other caused by adhering conductive dust and the like. Also, it can prevent reflection of a shadow of the electrode 102 to the image effectively with constituting the surface layer 106 by a ZnO film as similar with the insulation layer 104.

The antidust filter 107 shown in FIG. 12 is obtained after forming the surface layer 106 and removing the mask for surface layer. Since a step S107 and a step S108 (FIG. 14) which are manufacturing steps thereafter are similar manufacturing steps with the step S006 and the step S007 according to the first embodiment (FIG. 11), explanation thereof is omitted. Also, an optical device according to the second embodiment has similar effects with the optical device according to the first embodiment.

Third Embodiment

FIG. 15 is a plane view of an antidust filter 117 included in an optical device according to a third embodiment of the present invention. Also, FIG. 16 is a schematic cross sectional view showing manufacturing process of the antidust filter 117 according to the third embodiment, FIG. 17 is a flow chart showing manufacturing process of the optical device including the antidust filter 117.

In the optical device according to the third embodiment, composition of an electrode 112 and a method for manufacturing the electrode 112 included in the antidust filter 117 are different from the electrode 42 included in the antidust filter 36 according to the first embodiment. However, except for this different point, the optical device according to the third embodiment is similar with the optical device according to the first embodiment, thus, with respect to similar part with the optical device according to the first embodiment, explanation will be omitted.

As shown in FIG. 15, the antidust filter 117 comprises a filter substrate 40, an electrode 112 and an insulation layer 44 formed on one surface of the filter substrate 40. Below, a method for manufacturing the optical device according to the third embodiment including the antidust filter 117 will be specified by using FIG. 16 and FIG. 17.

Figure 16A:
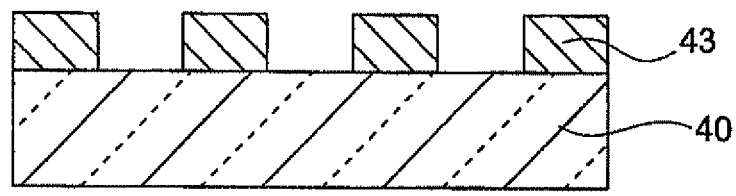

In a step S201 shown in FIG. 17, the filter substrate 40 is prepared, in a step S202, a mask for electrode 43 is arranged on a surface of the filter substrate 40 (FIG. 16(A)). With respect to the step S201 and step S202, it is similar with the step S001 and the step S002 in the first embodiment (FIG. 11).

In a step S203 shown in FIG. 11, the electrode 112 is formed by thin film formation processing to the filter substrate 40 to which the mask for electrode 43 is arranged. Although a manufacturing method for the electrode 112 is not particularly limited, the electrode 112 can be formed, for example, by sputtering. Note that, PVD (Physical Vapor Deposition) method other than sputtering may be used.

In case of forming the electrode 112 to the filter substrate 40 by sputtering, as similar with the first embodiment, the filter substrate 40 to which the mask for electrode 43 is set to a film forming portion of a sputtering device.

In the third embodiment, as for a target used at thin film forming the electrode 112, a Zn target composed of Zn is used. However, in case of forming the electrode 112 in a step S203, the electrode 112 composed of an oxygen deficient ZnO film is formed on the surface of the filter substrate 40 by film forming a ZnO film in which oxygen is intentionally deficient from stoichiometry (herein after, a ZnO film wherein oxygen is deficient intentionally is referred as a oxygen deficient ZnO film) (FIG. 16(B)). The oxygen deficient ZnO film becomes a status wherein carries are doped, the electric resistivity becomes lower than the ZnO film.

At the time of the oxygen deficient ZnO film to compose the electrode 112, an oxygen flow amount of the sputtering device is adjusted so that, the electric resistivity of the electrode 112 which is film formed on the surface of the filter substrate 40 becomes below a predetermined value. For example, the oxygen flow amount in sputtering is adjusted so that the electric resistivity of the electrode 112 become $1.0 \times 10^{-5}$ Ωm or less which is preferable. Therefore, a function of the electrode so as to change an electric field of the surface of the antidust filter 117 can be achieved efficiently by setting the electric resistivity of the electrode 112 as $1.0 \times 10^{-5}$ Ωm or less.

Figure 16B:
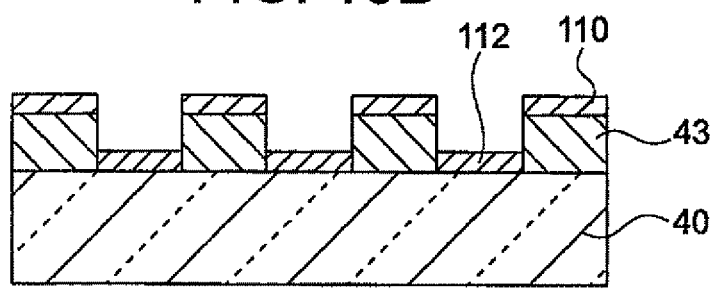
Figure 16C:
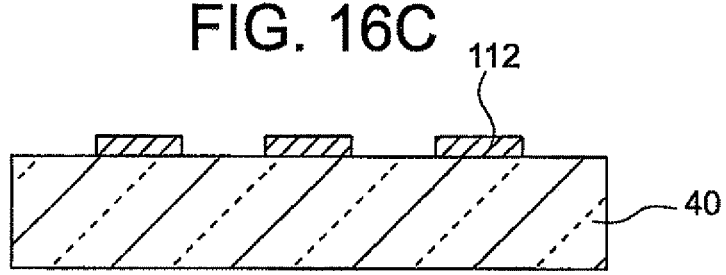
Figure 16D:
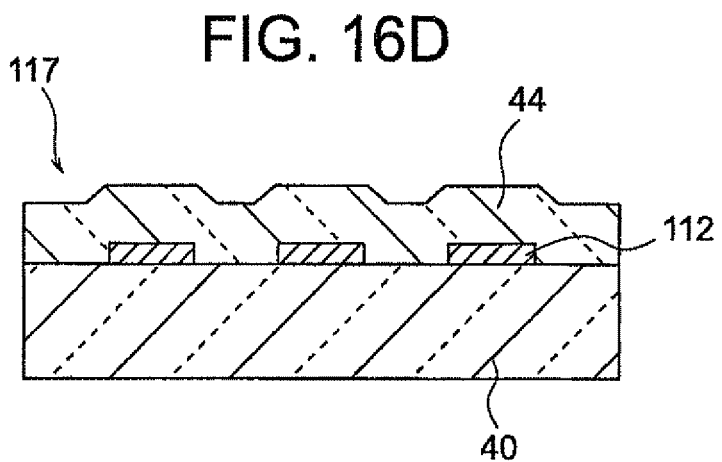

In this manner, in the step S203, the electrode 112 composed of the oxygen deficient ZnO film is formed on the filter substrate 40 (FIG. 16(B)). Also, the filter substrate 40 wherein the electrode 112 is formed on the surface is obtained by forming the oxygen deficient ZnO film as the electrode 112 and removing the mask for electrode 43 (FIG. 16(C)). Note that, a pitch of the electrode 112 formed in the step S203 is similar with the pitch of the electrode 42 in the first embodiment.

In a step S204 shown in FIG. 17, a mask for insulation layer is arranged on the filter substrate 40 in which the electrode 112 is formed on the surface. Further, in a step S205, an insulation layer 44 composed of a ZnO film is formed to the filter substrate 40 in which the electrode 112 is formed and the mask for insulation layer is attached (FIG. 16(D)). A Zn target composed of Zn is used for forming the insulation layer 44. When forming the insulation layer 44 in a step S205, the ZnO film is film formed so that the ZnO film becomes stoichiometry by adjusting oxygen flow amount in sputtering to form the insulation layer 44. ZnO of stoichiometry, it becomes an insulation body having high electric resistivity because a carrier is not doped. Note that, in the forming of the insulation layer 44 at the step S205, a ZnO target may be used as similar with the first embodiment. The step S205 of this case, explanation is omitted since it is similar with the step S004 according to the first embodiment.

Main components of the electrode 112 and the insulation layer 44 in the antidust filter 117 (FIG. 15) according the third embodiment are either ZnO which is an identical, refractive index and its dispersion of the electrode 112 and the insulation layer 44 become Very close values. Namely, in the antidust filter 117 according to the present embodiment, the optical properties of the electrode 112 and the insulation layer 44 is similar with, difference of reflectance and transmittance between the electrode 112 and the insulation layer 44 portions are small. Thereby, a camera include the antidust filter 117 can prevent reflection of a shadow of the electrode 102 to the image taken by the image pick up element unit. Also, in spite of the optical properties of the electrode 112 and the insulation layer 44 are, close, electric resistivity are different, thus, the electrode 112 preferably acts as a conductive portion having conductivity, the insulation layer 44 preferably acts as an insulating portion having insulation property.

A step S206 and a step S207 (FIG. 17) as manufacturing process after the step S205 are similar manufacturing steps with the step S006 and the step S007 (FIG. 11) according to the first embodiment, explanation thereof is omitted. Also, the optical device according to the third embodiment has similar effects with the optical device according to the first embodiment.

Other Embodiment

In the above mentioned first to third embodiments, although the electrodes, the insulation layers and the surface layers included in the antidust filter are formed by sputtering, manufacturing methods for the electrodes, the insulation layer and the surface layers are not limited thereto. For example, the electrodes, the insulation layers and the surface layers may be formed by etching and spin coating methods. Also, the antidust filter may further comprise oscillation elements attached to the surface of the filter, and may remove dust adhered on the surface of the antidust filter not only using an electric field changing, but also using a physical vibration of the antidust filter. Further, the surface of the antidust filter may comprise repellency and the antidust filter may prevent adhesion of dust by the volatility.

EXAMPLE

Below, optical properties of the electrodes 42, 102, 112 and the insulation layers 44, 104 included in the antidust filters 36, 107, 117 will be specified with reference to an example. However, optical properties shown in an example is merely an example, the optical properties of the electrodes 42, 102, 112 and the insulation layers 44, 104 are not limited to shown in the example.

FIG. 18 is a graph in which optical properties to light of visible area are compared with respect to the ZnO film to compose the insulation layers 44, 104, the Al dope ZnO film to compose the electrode 42, 102 and the oxygen deficient ZnO film to compose the electrode 112 in the first to third examples. A longitudinal axis of FIG. 18 shows a refractive index, a transverse axis shows a wave length of input light, and FIG. 18 shows dispersion (refractive index change according to change of the wavelength of incoming light) of the ZnO film, the Al dope ZnO film and the oxygen deficient ZnO film. Note that, the refractive index is evaluated by calculating measured reflectance and transmittance by a spectrophotometer.

In FIG. 18, comparing dispersion of the ZnO film (thick solid line) and the oxygen deficient ZnO film (dashed line), it is noted that both refractive indices are very close at whole visible area. Therefore, in the antidust filter 117 shown in the third embodiment (FIG. 15), it is noted that the refractive index of the insulation layer 44 composed of the ZnO film and the refractive index of the electrode 112 composed of the oxygen deficient ZnO film comprise very close values at whole visible area.

Thus, since the optical properties of the electrode 112 and the insulation layer 44 are similar, it is noted that the antidust filter 117 according to the third embodiment can prevent reflection of a shadow of the electrode 42 to the image taken by the image pick up element unit 16 (refer to FIG. 1 and the like). Because a refractive index difference in the visible area generated at the electrode 42 and the insulation layer 44 portions is small, as a result a gap of the reflectance and transmittance becomes small as it can be read from the graph shown in FIG. 18.

In FIG. 18, comparing dispersion of the ZnO film (bold solid line) and dispersion of the Al dope ZnO film (dashed line), it is noted that both refractive indices are very close at whole visible area. Thus, in the antidust filters 36, 107 shown in the first and second embodiments (FIG. 10, FIG. 12), it is noted that the refractive indices of the insulation layers 44, 104 composed of the ZnO film and the refractive indices of the electrodes 42, 102 composed of the Al dope ZnO film comprise very close values at whole visible area.

Therefore, the optical properties of the electrodes 42, 102 and the insulation layers 44, 104 are similar, it is noted the antidust filters 36, 107 according to the first and second embodiments can prevent reflection of a shadow of the electrode 42, 102 to the image taken by the image pick up element unit 16 (refer to FIG. 1 and the like). Because, as it can be read from the graph shown in FIG. 18, a refractive index difference at the visible area generated at the electrodes 42, 102 and the insulation layers 44, 104 portions is small, as a result, a difference of the reflectance and the transmittance becomes small. Note that, although the Al dope ZnO film is poor from the oxygen deficient ZnO film in view of similarity of the optical property to the ZnO film, it is advantageous than the oxygen deficient ZnO film, in view of material stability.

FIG. 19 is a graph in which optical properties to a light of a visible area for comparing examples, with respect to ITO (indium tin oxide) which is transparent conductive material and transparent insulation materials ($Ta_2O_5$, $Nb_2O_5$, $HfO_2$, $Al_2O_3$) whose optical properties are considered as similar to ITO. A longitudinal axis of FIG. 19 shows a refractive index, a traverse axis shows a wavelength of incoming light. Note that, refractive index is evaluated by calculating measured reflectance and transmittance by a spectrophotometer.

In case of comparing with the example shown in FIG. 18, it is noted that optical properties of transparent insulation materials ($Ta_2O_5$, $Nb_2O_5$, $HfO_2$, $Al_2O_3$) and ITO as a conductive material are largely different. For example, in FIG. 19, although $HfO_2$ (dashed line) is close refractive index at one portion of short wavelength side to ITO, the refractive index differs largely if viewing from whole visible area. Also, although $Al_2O_3$ (chain double dashed line) is close refractive index at one portion of long wavelength side to ITO, the refractive index differs largely if viewing from whole visible area.

From FIG. 19, it is noted that, for example, the electrode is constituted by ITO instead of the Al dope ZnO film, the insulation layer is constituted by any one of $Ta_2O_5$, $Nb_2O_5$, $HfO_2$ or $Al_2O_3$ instead of the ZnO film, it cannot prevent reflection of a shadow of the electrode to the image effectively as from the example. Because, the graph shown in FIG. 19, a gap of refractive index at a visible area generated at the electrode and the insulation portions is large, as a result, a difference of a reflectance and a transmittance becomes larger.

From FIG. 18 and FIG. 19, it is noted that the antidust filters 36, 107, 117 including the insulation layers 44, 104 composed of the ZnO film and the electrodes 42, 102, 112 whose main component is identical with the main component of the insulation layer 44, 104 can prevent reflection of a shadow of the electrode 42 to the image taken by the image pick up element unit 16 (refer to FIG. 1 and the like). Also, the antidust filters 36, 107, 117 largely improve a problem of reflection of a shadow of the electrodes 42, 102, 112 as compared in case of constituting an electrode by ITO and constituting an insulation layer by an insulation material whose main component is different from ITO film.

The invention claimed is:

1. An image pickup device comprising
an image pickup element taking an image;
an optical low pass filter transmitting light positioned closer to a subject than said image pickup element;
an insulation portion transmitting light, provided on the optical low pass filter;
a first electrode and a second electrode transmitting light provided on said optical low pass filter so as to sandwich said insulation portion along a direction parallel to an image pick up face of the image pickup element; and
an output circuit configured to output voltage to said first electrode and second electrode so as to change an electric field of a surface of said optical low pass filter, wherein:
said first and second electrodes comprise a main component which is the same main component of said insulation portion, and has an electric resistivity lower than that of said insulation portion.

2. The image pickup device as set forth in claim 1, wherein said first and second electrodes are comprised of at least one of a material obtained by doping a metal in said insulation portion and a material obtained by transforming the insulation portion into a oxygen deficient conductor.

3. The image pickup device as set forth in claim 1 wherein, said insulation portion, said first electrode and said second electrode have the main component of ZnO.

4. The image pickup device as set forth in claim 1, wherein said insulation portion is a film provided on said optical low pass filter.

5. The image pickup device as set forth in claim 4, wherein said first electrode and second electrode are covered by said insulation portion.

6. The image pickup device as set forth in claim 1, wherein said insulation portion, said first electrode and said second electrode are comprised of a film provided on said substrate.

7. The image pickup device as set forth in claim 6 comprising a covering film configured to cover said first electrode and said second electrode.

8. An optical equipment comprising the image pickup device as set forth in claim 1.

9. A method for manufacturing an image pickup device having an antidust filter sealing the space which receives an image pickup element taking an image, comprising steps of
preparing a birefringence plate transmitting light,
forming said antidust filter by forming an insulation portion transmitting light and a first electrode and a second electrode transmitting light on said birefringence plate so that said first electrode and said second electrode sandwich said insulation portion along a direction parallel to an image pick up face of said image pickup element, and said first electrode, said second electrode and the insulation portion have the same main component, said first electrode and said second electrode have lower electric resistance with respect to said insulation portion;
sealing the space which receives an image pickup element by said antidust filter; and
connecting electrically said first electrode and said second electrode to an output circuit outputting voltage to said first electrode and said second electrode so as to change an electric field of a surface of said birefringence plate.

10. The method for manufacturing an image pickup device as set forth in claim 9, wherein
said first electrode and said second electrode are formed by doping a metal in said insulation portion.

11. The method for manufacturing image pickup device as set forth in claim 9, wherein
said first electrode and said second electrode are formed by transforming the insulation portion into an oxygen deficient conductor.

12. The method for manufacturing image pickup device as set forth in claim 9, further comprising the step of:
forming a film to cover said first electrode and said second electrode.

* * * * *